United States Patent
Staver

(10) Patent No.: US 9,207,434 B2
(45) Date of Patent: Dec. 8, 2015

(54) DUAL-BAND PASSIVELY ATHERMAL OPTICAL LENS SYSTEM

(71) Applicant: BAE SYSTEMS Information & Electronic Systems Integration Inc., Nashua, NH (US)

(72) Inventor: Philip R. Staver, Wilton, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/631,075

(22) Filed: Feb. 25, 2015

(65) Prior Publication Data

US 2015/0241667 A1    Aug. 27, 2015

Related U.S. Application Data

(60) Provisional application No. 61/944,083, filed on Feb. 25, 2014.

(51) Int. Cl.
| | |
|---|---|
| G02B 7/02 | (2006.01) |
| G02B 13/14 | (2006.01) |
| G01J 5/08 | (2006.01) |
| G01J 5/06 | (2006.01) |
| G01J 5/10 | (2006.01) |
| G01J 5/00 | (2006.01) |

(52) U.S. Cl.
CPC ............... *G02B 13/146* (2013.01); *G01J 5/061* (2013.01); *G01J 5/0806* (2013.01); *G01J 5/10* (2013.01); *G02B 7/021* (2013.01); *G02B 7/028* (2013.01); *G01J 2005/0077* (2013.01); *G01J 2005/106* (2013.01)

(58) Field of Classification Search
CPC .................. G01J 2005/0077; G01J 2005/106; G01J 5/061; G01J 5/0806; G01J 2/10; G02B 13/146; G02B 7/021; G02B 7/028
See application file for complete search history.

(56) References Cited

U.S. PATENT DOCUMENTS

| | | | | |
|---|---|---|---|---|
| 8,101,918 B1* | 1/2012 | Mercado | ........................ | 250/352 |
| 2006/0091310 A1* | 5/2006 | Furry | ............................. | 250/330 |
| 2012/0229914 A1* | 9/2012 | Cook | ............................. | 359/689 |
| 2013/0016220 A1* | 1/2013 | Brown | .......................... | 348/164 |
| 2013/0187047 A1* | 7/2013 | Cook | ............................. | 250/330 |
| 2014/0002665 A1* | 1/2014 | Kingdon et al. | .............. | 348/164 |
| 2014/0139926 A1* | 5/2014 | Cook | ............................. | 359/629 |
| 2015/0028212 A1* | 1/2015 | Wright et al. | ................. | 250/340 |

\* cited by examiner

*Primary Examiner* — Mark R Gaworecki
(74) *Attorney, Agent, or Firm* — Davis & Bujold, PLLC; Michael J. Bujold; Daniel J. Long

(57) ABSTRACT

An optical lens system for focusing light on a focal plane for detection by a detector device. The optical lens system comprises a series of optical materials including first and last optical materials with a plurality of other optical materials located therebetween. A housing accommodates the series of optical materials, and each of the optical materials is spaced a desired distance from one another. An external entrance pupil supplies infrared light to the series of optical materials of the optical lens system, and the entrance pupil is located in front of the first optical material. A Dewar window and a filter are located between the last optical material and the focal plane. The optical materials are selected and arranged to focus simultaneously both mid-wave infrared light and long-wave infrared light on the focal plane over a wide temperature range.

20 Claims, 20 Drawing Sheets

OPTICAL CONFIGURATION

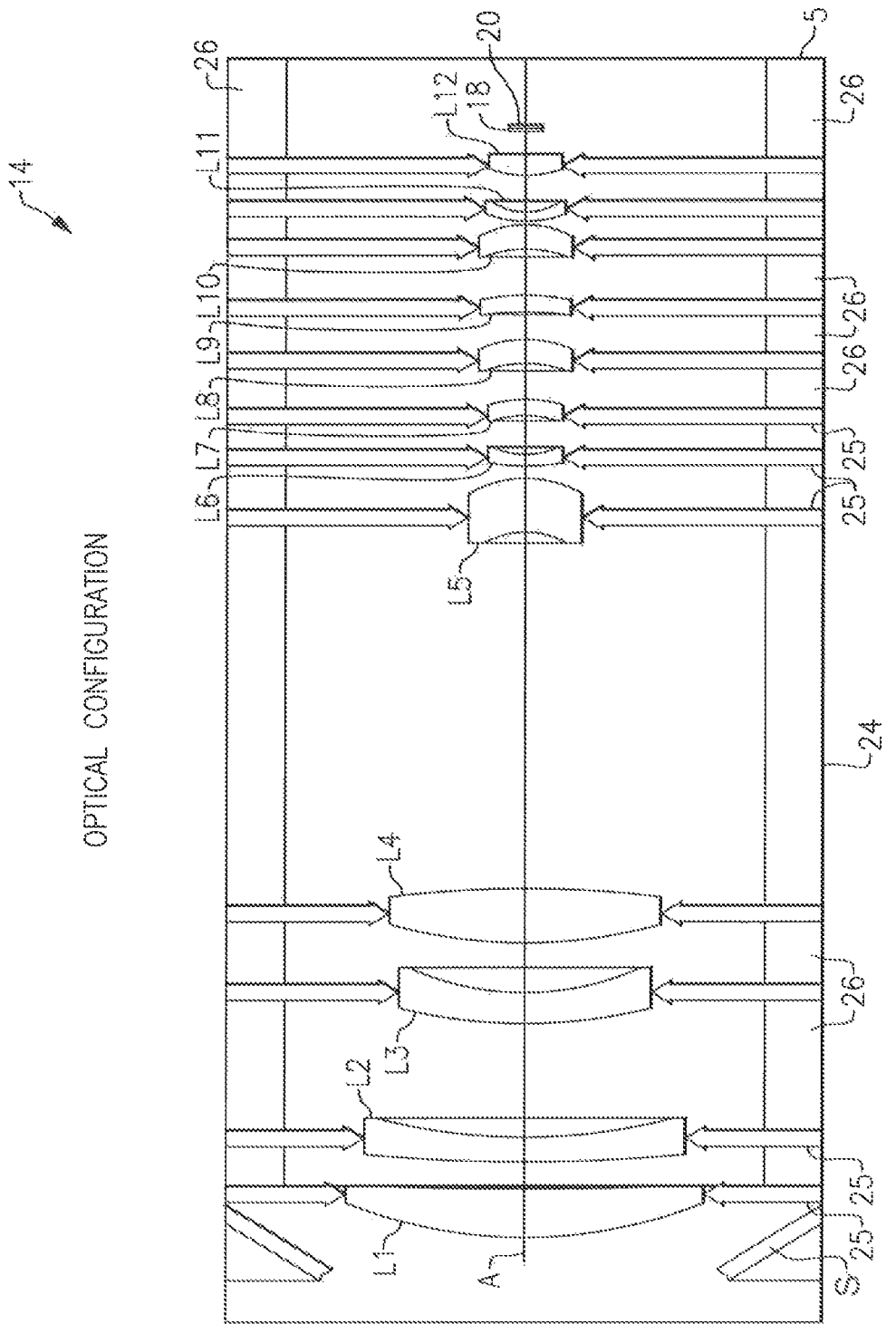

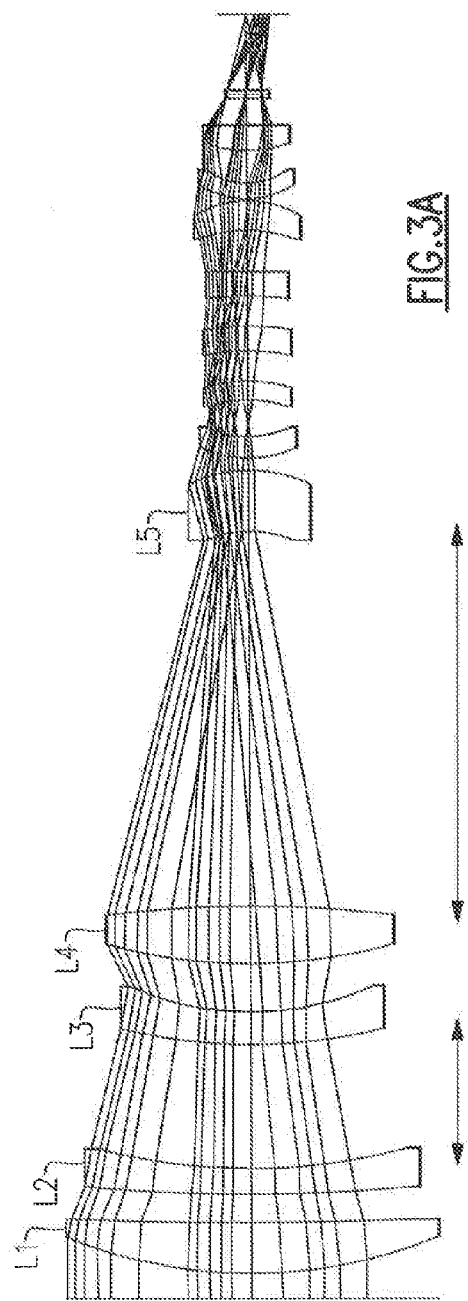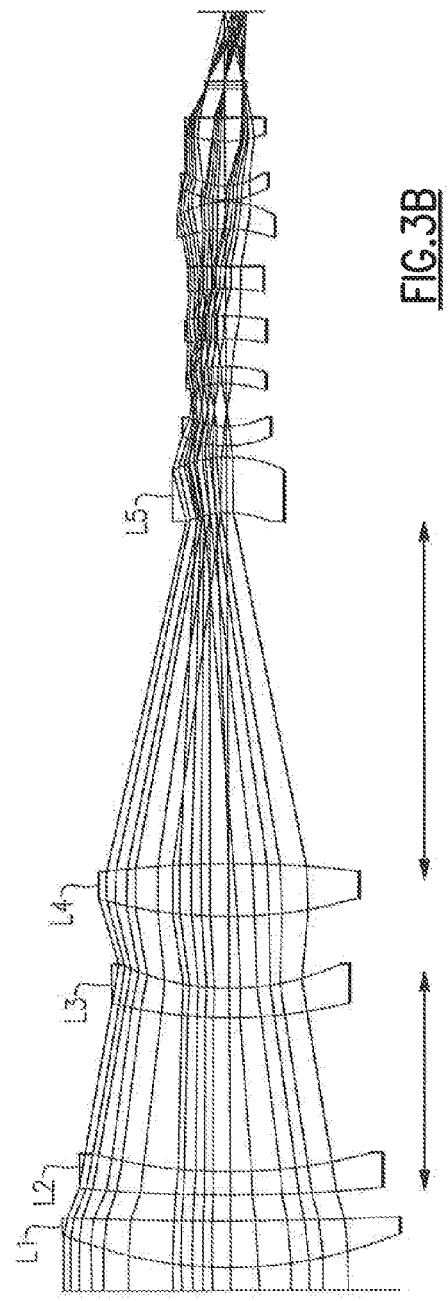

FIG. 4

Table 1: Optical Prescription

| Component | Sur # | Type | Radius of Curvature (mm) | Radius of Curvature (inch) | Thickness (mm) | Thickness (inch) | Material | Clear Aperture Diameter* (mm) | Clear Aperture Diameter* (inch) |
|---|---|---|---|---|---|---|---|---|---|
| L1 | S1 | EVENASPH | 196.382 | 7.732 | 18.978 | 0.747 | AMTIR1 | 141.38 | 5.57 |
|  | S2 | SPH | 1347.588 | 53.055 | 11.629 | 0.458 |  | 138.21 | 5.44 |
| L2 | S3 | SPH | 957.403 | 37.693 | 9.577 | 0.377 | ZnS | 126.92 | 5.00 |
|  | S4 | SPH | 258.848 | 10.191 | 44.803 | 1.764 |  | 120.11 | 4.73 |
| L3 | S5 | SPH | 205.265 | 8.081 | 12.262 | 0.483 | Ge | 100.02 | 3.94 |
|  | S6 | SPH | 110.055 | 4.333 | 19.722 | 0.776 |  | 92.08 | 3.63 |
| L4 | S7 | SPH | 195.500 | 7.697 | 22.000 | 0.866 | AMTIR1 | 108.08 | 4.25 |
|  | S8 | SPH | -385.433 | -15.175 | 141.582 | 5.574 |  | 107.74 | 4.24 |
| Field Lens L5 | S9 | EVENASPH | -39.727 | -1.564 | 21.998 | 0.866 | Ge | 31.86 | 1.25 |
|  | S10 | SPH | -44.771 | -1.763 | 4.244 | 0.167 |  | 44.82 | 1.76 |
| L6 | S11 | SPH | 55.505 | 2.185 | 4.419 | 0.174 | ZnS | 32.84 | 1.29 |
|  | S12 | SPH | 32.464 | 1.278 | 16.187 | 0.637 |  | 28.83 | 1.13 |
| L7 | S13 | SPH | -43.915 | -1.729 | 6.062 | 0.239 | CLEARTRAN | 27.77 | 1.09 |
|  | S14 | SPH | -55.332 | -2.178 | 14.646 | 0.577 |  | 30.43 | 1.20 |
| L8 | S15 | SPH | -50.805 | -2.000 | 9.893 | 0.389 | AMTIR1 | 34.31 | 1.35 |
|  | S16 | SPH | -39.984 | -1.574 | 10.555 | 0.416 |  | 38.57 | 1.52 |
| L9 | S17 | SPH | -176.618 | -6.953 | 6.779 | 0.267 | ZNSE | 34.63 | 1.36 |
|  | S18 | EVENASPH | -144.498 | -5.689 | 18.385 | 0.724 |  | 34.66 | 1.36 |
| L10 | S19 | EVENASPH | -49.692 | -1.956 | 9.791 | 0.385 | AMTIR1 | 34.65 | 1.36 |
|  | S20 | SPH | -40.824 | -1.607 | 1.000 | 0.039 |  | 38.14 | 1.50 |
| L11 | S21 | SPH | 40.167 | 1.581 | 3.771 | 0.148 | ZnS | 33.14 | 1.30 |
|  | S22 | SPH | 25.800 | 1.015 | 14.545 | 0.573 |  | 29.57 | 1.16 |
| L12 | S23 | SPH | 44.720 | 1.761 | 8.491 | 0.334 | AMTIR1 | 29.30 | 1.15 |
|  | S24 | SPH | -13341.439 | -525.253 | 10.000 | 0.394 |  | 26.79 | 1.05 |
| Dewar Window | S25 | FLAT | Plano | Plano | 1.730 | 0.068 | Ge | 14.79 | 0.58 |
|  | S26 | FLAT | Plano | Plano | 0.500 | 0.020 |  | 14.34 | 0.56 |
| Filter | S27 | FLAT | Plano | Plano | 0.400 | 0.016 | SILICON | 13.74 | 0.54 |
|  | S28 | FLAT | Plano | Plano | 0.500 | 0.020 |  | 13.62- | 0.54 |
| Cold Shield | S29 | FLAT | Plano | Plano | 25.700 | 1.012 |  | 13.02 | 0.51 |
|  | S30 | FLAT | Plano | Plano | 0.000 | 0.000 |  | 17.81 | 0.70 |

*Clear Aperture Diameter Does Not Include Mechanical Mounting Requirement

FIG. 11

Table 2: Thermal Model Including Dewar and Cold Finger

| Component | Thermal Flow | Thickness | Glass | CTE |
|---|---|---|---|---|
| Housing | 81 | 1.00 | | TBD |
| L11 | 82 | 3.77 | ZnS | - |
| Housing | 83 | 14.55 | | TBD |
| L12 | 84 | 8.49 | AMTIR1 | - |
| Housing | 85 | 10.00 | | TBD |
| Housing | 86 | 32.20 | | TBD |
| Selex Interface | 87 | 0.00 | | 5.1 |
| Kovar | 88 | -32.20 | | - |
| Dewar Window | 89 | 1.73 | Ge | 5.1 |
| Kovar | 90 | 0.50 | | - |
| Filter | 91 | 0.40 | Si | 5.1 |
| Kovar | 92 | -0.40 | | 5.1 |
| Kovar | 93 | -0.50 | | 5.1 |
| Kovar | 94 | -1.73 | | 5.1 |
| Kovar | 95 | 32.20 | | 5.1 |
| SS (316) | 96 | 4.00 | | 15.9 |
| Kovar | 97 | 41.20 | | 5.1 |
| Isothermal | 98 | -41.20 | | 0.0 |
| Isothermal | 99 | -4.00 | | 0.0 |
| Isothermal | 100 | -29.07 | | 0.0 |
| Cold Shield | 101 | 25.70 | | 0.0 |
| Defocus Dummy | 102 | 0.00 | | 0.0 |
| Focal Plane | 103 | 0.00 | | 0.0 |

Selected by optimization (individually, or in groups)

Simulates isothermal action of cold finger

Design of Passively Athermal Chassis:

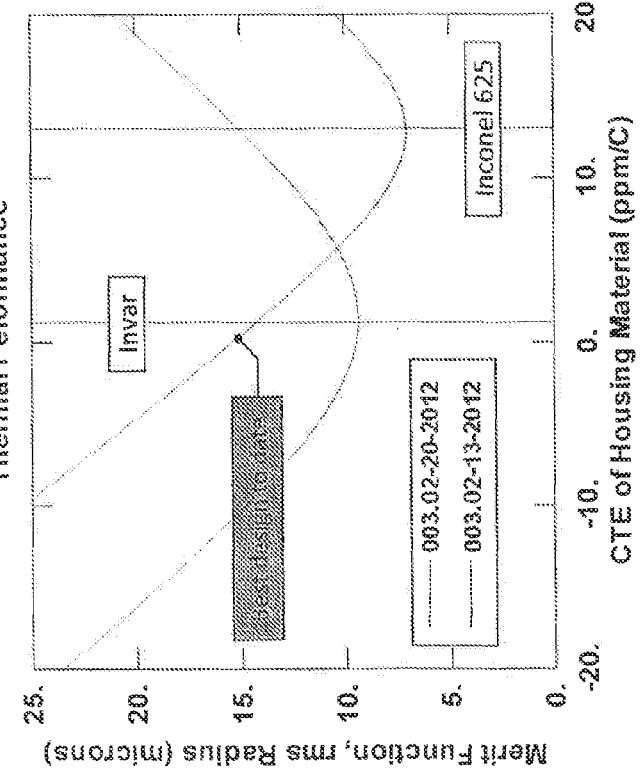

FIG. 12A

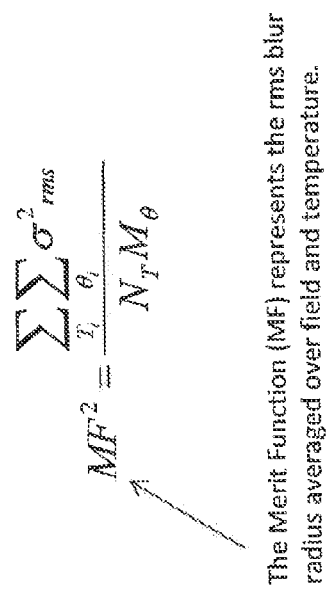

| Material | CTE (ppm/C) |
|---|---|
| Invar | 1.2 |
| Kovar | 5.1 |
| Titanium | 9.0 |
| Inconel 718 | 12.8 |
| Inconel 625 | 13.0 |
| SS 316 | 15.9 |
| Al 1100 | 23.6 |

$$MF^2 = \frac{\sum_{T_i}\sum_{\theta_i} \sigma^2_{rms}}{N_T M_\theta}$$

The Merit Function (MF) represents the rms blur radius averaged over field and temperature.

FIG. 12B

*Note: This optimization assumes the entire chassis housing is made of the same material. The optimal value of the CTE will be different if parts of the housing are made of different material (eg. Aluminum)*

Note: This computation does not account for the dewar housing

Design of Passive Athermalized Housing
Alternate Spacer Material Options

| Configuration Option | Optimal Housing CTE (ppm/C) |
|---|---|
| 1 | 12.8 |
| 2 | 7.74 |
| 3 | 9.61 |

Design of spacer material for different Aluminum Alloys
Configuration: Spacer Configuration Option 3
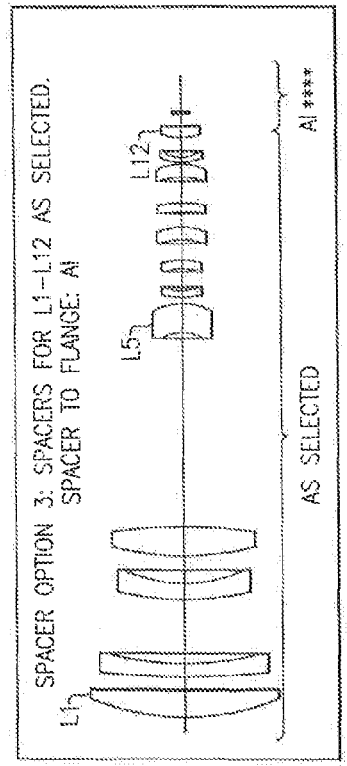
| ALUMINUM ALLOY | CTE OF ALUMINUM (ppm/C) | OPTIMIZED CTE OF HOUSING (ppm/C) |
|---|---|---|
| 6061 | 23.0 | 9.783 |
| 6063 | 23.4 | 9.668 |
| 1100 | 23.6 | 9.611 |
| 5052 | 23.8 | 9.553 |
FIG. 17B
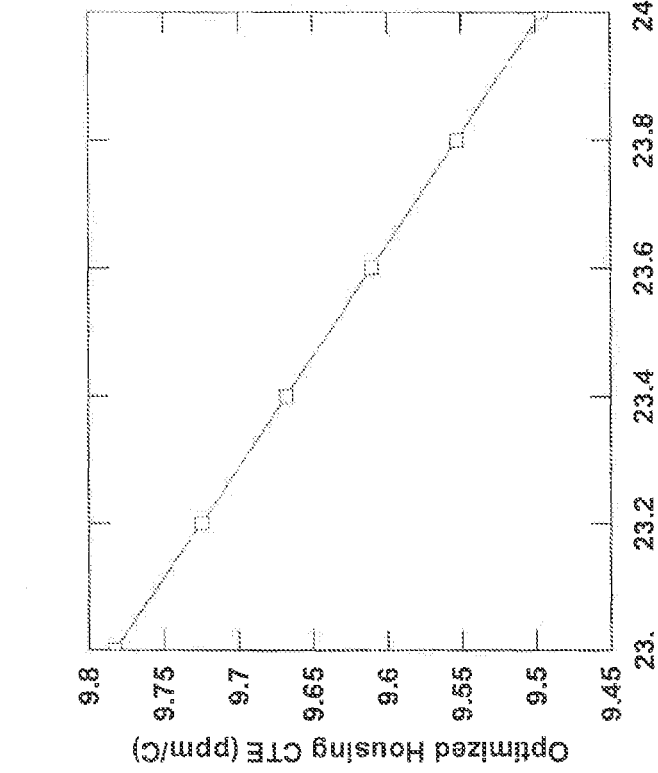
SPACER OPTION 3: SPACERS FOR L1–L12 AS SELECTED. SPACER TO FLANGE: Al
FIG. 17C
FIG. 17A

DUAL-BAND PASSIVELY ATHERMAL OPTICAL LENS SYSTEM

This application claims the benefit of U.S. Provisional Application No. 61/944,083 filed Feb. 25, 2014.

FIELD OF THE INVENTION

This invention relates to optical lens systems in general, and more particularly, an optical lens system that operates in infrared regions which is able to capture and simultaneously image, on an imaging plane, both mid-wave infrared and long-wave infrared wavelengths over a wide ranges of operating temperatures of the optical lens systems.

BACKGROUND OF THE INVENTION

As is conventional in the prior art, optical systems traditionally operate in either mid-wave infrared regions (MWIR) or long-wave infrared regions (LWIR) but not typically both at the same time. One of the primary reasons for not processing both mid-wave infrared and long-wave infrared wavelengths together is that it is extremely difficult to capture and simultaneously focus both mid-wave infrared and long-wave infrared wavelengths, using a single imaging system comprising a series of transparent materials or lens, on an imaging or focal plane. This imaging problem, of both mid-wave infrared and long-wave infrared wavelengths, is compounded if the optical lens system is intended to operate over a wide range of operating temperatures. Such a wide range of operating temperatures is normally present when the optical lens system is intended to be utilized in an aircraft, for example, where the optical lens systems is normally subject to extremely cold operating temperatures, e.g., when the aircraft is flying at high altitudes, and may also be subject to extremely hot operating temperatures, e.g., when, for example, the aircraft is parked on an airfield, between flights, on a hot summer day.

As a result of the above noted problems, the most efficient way to solve certain optical sensing and detection problems is to operate the optical lens system either exclusively in the mid-wave or exclusively in the long-wave infrared regions. Additionally, as briefly alluded to above, traditional optical lens systems typically do not remain in focus over a wide range of operating temperatures unless such optical systems include extremely expensive and complex mechanical arrangements which are designed to compensate for the temperature fluctuations and mechanically alter the orientation of the lens as the temperature of the optical lens system varies.

Finally, the entrance pupil location, for traditional mid-wave infrared and long-wave infrared optical systems, has normally been located at a location that is behind the optical lens system. For application of an optical lens system in an aircraft, for example, it is often difficult to be able to locate the imaging or optical lens system so that the entrance pupil can be located behind at least the first lens of the optical lens system.

SUMMARY OF THE INVENTION

Wherefore, it is an object of the present invention to overcome the above mentioned shortcomings and drawbacks associated with the prior art.

It is an object of the present invention to provide an optical lens system, for use in an aircraft for example, which operates over a wide range of operating temperatures and is able to properly function and focus both mid-wave infrared and long-wave infrared light under both extremely cold and extremely hot operating temperatures as well as temperatures therebetween. That is, the optical lens systems functions properly and focuses both mid-wave and long-wave infrared light over a range of temperatures from about −40° C. to about 60° C.

Still another object of the present invention is to provide an optical lens system which is completely passive and athermal so that the optical lens system is able to accurately, reliably and consistently gather both mid-wave infrared and or long-wave infrared wavelength light and focus the same on an imaging or focal plane for detection by a conventional detector.

Another object of the present invention is to accommodate and individually support each lens, of the optical lens system, within a housing. As a result of such individually support of each one of the lenses, as the housing either gradually expands and/or contracts, due to temperature variations, the entire optical lens system, including the spacers located between the adjacent lens, correspondingly gradually expands or contracts as a function of the temperature. Such uniform expansion or contraction of the housing minutely adjusts the relative spacing of each one of the lenses with respect to one another, and thus correspondingly assists with automatically compensating for temperature variations of the optical lens system so as that the optical lens system still provides accurate, reliable and consistent imaging of the gathered and focused light on the imaging or focal plane.

Yet another object of the present invention is to provide an optical lens system which is relatively compact in both length and diameter so that the optical lens system can be conveniently installed and supported on an aircraft, such as a jet fighter or a commercial airline, in a relatively small installation area or location, e.g., incorporated into a portion of a wing of an aircraft.

Yet another object of the present invention is to provide an optical lens system which has an overall length of 443.050 mm (17.44 inches), measured from the first entrance lens to the imaging or focal plane, while the entrance pupil of the optical lens system is preferably located in front of the first entrance lens, of the optical lens system, to facilitate installation of the optical lens system at a location which is spaced from a window of the aircraft.

A still further object of the invention is to locate the entrance pupil of the optical lens system a sufficient distance away from the first entrance lens of the optical system so that one or more mirrors, beam splitters, or the like, can be located between the window, supplying the mid-wave infrared and or long-wave infrared wavelength light, and the entrance lens of the optical lens system.

A further object of the present invention is to manufacture the housing from a light weight material, such as aluminum and Inconel (e.g., Inconel 718 or Inconel 625 or any similar austenite nickel-chromium-based superalloy) which is relatively strong and durable material which does not significantly add to the overall weight of optical lens system or introduce any focusing problems when the optical lens system expands and contracts during operation under hot/cold operating conditions.

Still another object of the present invention is to utilize a desired spacer, having a desired thermal expansion/contraction characteristic, between each adjacent pair of lenses. Thus, each spacer, as the optical lens system is subjected to a variety of operating conditions, correspondingly expands or contracts and thereby minutely alters the relative spacing of each pair of adjacent lenses, of the optical lens system, from one another. Corresponding compensation is thereby facilitated by each spacer, for the temperature variations that the optical lens system is subjected to during operation. This ensures that the optical lens system is able to provide accurate, reliable and consistent focusing of the mid-wave and long-wave infrared light on the imaging or focal plane regardless of any potential temperature variations.

A further object of the present invention is to utilize a first type of spacer for a first series or group of lenses, of the optical lens system, and utilize a second type of spacer for a second series or group of lenses, of the optical lens system. The first and the second spacers having different coefficients of expansion/contraction from one another so as to compensate for the gradual expansion and contraction of the optical lens system as the system operates over a wide range of temperature variations.

The present invention also relates to an optical lens system that is capable of operating simultaneously in both mid-wave and long-wave infrared regions so as to collect and focus, on an imaging or focal plane, light contained within both ranges. It is to be appreciated that certain optical sensing and detection problems can be solved efficiently when optical data, from both the mid-wave and long-wave infrared wave-bands, is simultaneously available to an optical image processing application. That is, the associated detection and processing apparatus can utilize information from both mid-wave and long-wave infrared regions to determine which information is clutter or extraneous artifacts and which is useful information and process the focuses mid-wave and long-wave infrared data to determine a desired "target" or some other object or point of interest.

By careful selection of the optical materials to be used as lens in the optical lens system, the optical lens system can remain passively athermal over wide temperature ranges, e.g., −40° C. to 60° C. In addition, the careful selection of optical material ensures that the lens optical system is, and remains, in focus throughout the entire range of temperature variations that the optical lens system may be subjected to without the need for any mechanical adjustment or intervention of the optical lens system.

The present invention also relates to an optical lens system for receiving light, via an entrance pupil, and focusing light on a focal plane for detection by a detector device, the optical lens system comprising: a series of optical materials comprising a first optical material and a last optical material with a plurality of other optical materials located between the first optical material and the last optical material; a housing accommodating the series of optical materials, and each of the optical materials being spaced a desired distance from one another; the external entrance pupil for supplying infrared light to the series of optical materials of the optical lens system, and the entrance pupil being located in front of the series of optical materials; at least one beam of infrared light passing through the external entrance pupil and through the series of optical materials accommodated within the housing; a Dewar window and a filter being located between the last optical material and the focal plane; and the series of optical materials of the optical lens system are selected and arranged so as to focus simultaneously both mid-wave infrared light and long-wave infrared light, of the at least one beam of infrared light, on the focal plane over at temperature range from about −40° C. to 60° C.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which:

FIG. 1 is a diagrammatic side elevational view of a first embodiment of the optical lens system according to the present invention;

FIGS. 3A and 3B are diagrammatic side elevational views of alternate embodiments of the optical lens system;

FIG. 4 is a table providing information concerning the physical properties of each of the optical materials of the first embodiment;

FIG. 11 is a table of the thermal model;

FIGS. 12A and 12B are, respectively, a graphic representation and a table representation of different materials for use in passive athermal chassis design;

FIG. 16C is a housing embodiment in which all the spacers are manufactured from the same material, while FIGS. 16D and 16E show housing embodiments in which some of the spacers are manufactured from a first material while the remaining spacers are manufactured from a second material; and FIGS. 17A and 17B are, respectively, a graphic representation and a table representation of a spacer material while FIG. 17C is a housing embodiment in which some of the spacers are manufactured from a first material while the remaining spacers are manufactured from different Aluminum alloys.

DETAILED DESCRIPTION OF THE PREFERRED EMBODIMENTS

Figure 2A:
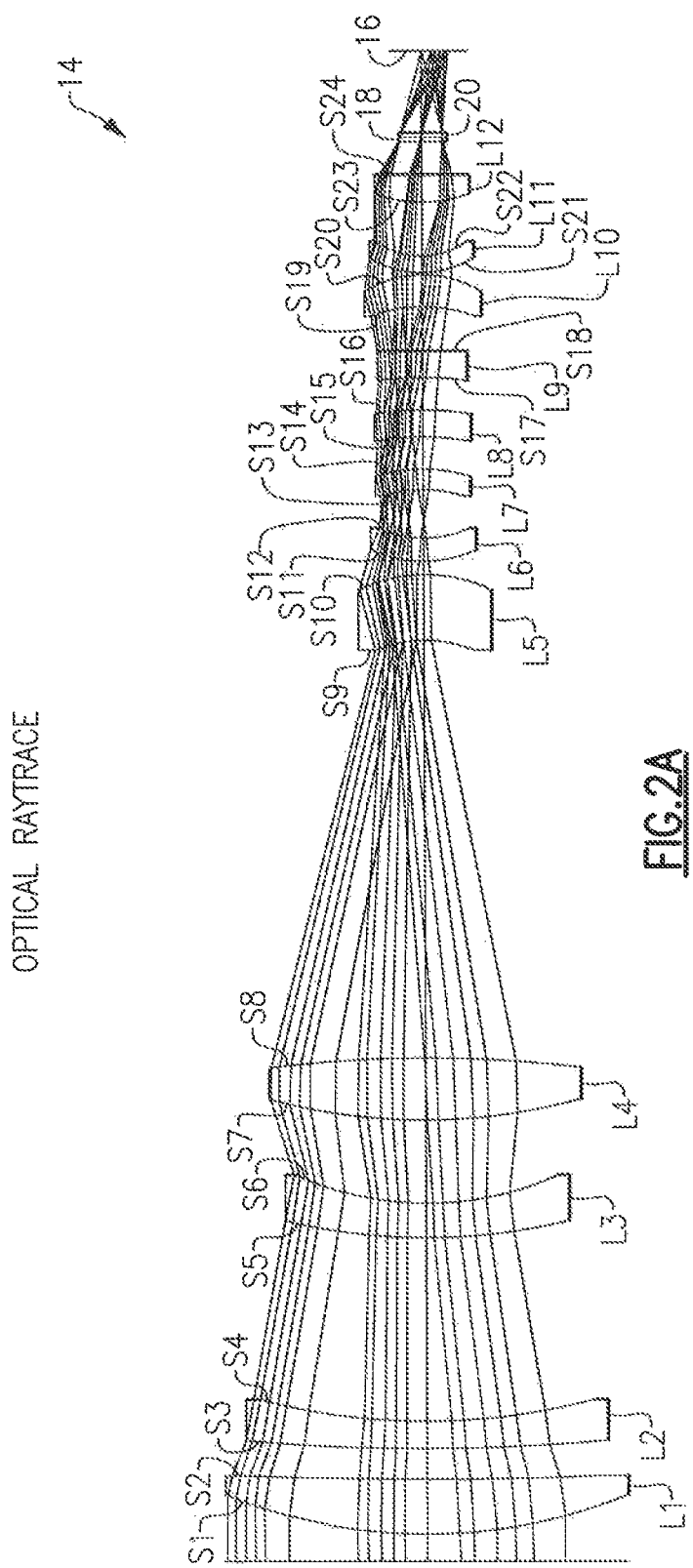
FIG. 2A is a diagrammatic side elevational view of the embodiment of FIG. 1, shown with representative raytrace.

The present invention will be understood by reference to the following detailed description, which should be read in conjunction with the appended drawings. It is to be appreciated that the following detailed description of various embodiments is by way of example only and is not meant to limit, in any way, the scope of the present invention.

A preferred embodiment of the lens optical system 14, is diagrammatically shown in FIG. 1. The lens optical system 14 has an overall length, i.e., from a leading surface S1 of the first entrance optical component or lens L1 to surface S29 of the focal plane 16 of the lens optical system 14, of 443.050 mm (17.44 inches). However, it is to be appreciated that the overall length of the lens optical system 14 can vary, from application to application, without departing from the spirit and scope of the present invention. Preferably, the overall length of the optical lens system 14 will typically range between 300 mm (11.81 inches) and 700 mm (27.56 inches).

As shown in FIG. 1, the imaging or lens optical system 14 generally comprises a total of 12 separate lenses, namely, lens L1, L2, L3, L4, L5, L6, L7, L8, L9, L10, L11 and L12. Each one of the lenses L1, L2, L3, L4, L5, L6, L7, L8, L9, L10, L11 and L12 is spaced apart from one another and has the physical properties, e.g., the type of material, the lens thicknesses, the clear aperture diameter, the lens type and the radius of curvature for each surface, which are listed in Table 1 of FIG. 4. It is to be appreciated that by carefully selecting the various optical material and properties for each lens, the optical lens system 14 can remain passively athermal over wide ranges of operating temperatures, preferably from about −40° C. to about 60° C. This ensures that the lenses L1 L2, L3, L4, L5, L6, L7, L8, L9, L10, L11 and L12 of the optical lens system 14 are able to compensate for temperature fluctuations that the lens optical system 14 may be exposed to during operation over a wide ranges of operating temperatures.

As shown in this Figure, the transparent materials or lens L1, L2, L3, L4, L5, L6, L7, L8, L9, L10, L11 and L12 are spaced at varying distances from one another and each of the transparent materials or lens have varying thicknesses and curvatures, which are listed in Table 1 of FIG. 4. A Dewar window 18, of a Dewar 40, and a filter 20 are located between the last exit transparent material or lens L12 and the focal plane 16 of the optical lens system 14. A suitable Dewar 40, for use with the present invention, is the "Harrier LWIR" manufactured by Selex ES S.p.A of Piazza Monte Grappa no 4, Rome, Italy. The infrared light 22, e.g, both mid-wave and long-wave infrared light, when traveling thorough the optical lens system 14, passes through each and every one of the transparent materials or lenses L1, L2, L3, L4, L5, L6, L7, L8, L9, L10, L11 and L12 of the system 14, the Dewar window 18 and the filter 20 before finally being imaged and focused on the focal plane 16.

The first lens L1 has a light entrance (first) surface S1 and a light exit (second) surface S2 with both of those surfaces having the radius of curvatures listed in Table 1 of FIG. 4. The second lens L2 has a light entrance (first) surface 33 and a light exit (second) surface S4 with both of those surfaces having the radius of curvatures listed in Table 1 of FIG. 4. The third lens L3 has a light entrance (first) surface 35 and a light exit (second) surface S6 with both of those surfaces having the radius of curvatures listed in Table 1 of FIG. 4. The fourth lens L4 has a light entrance (first) surface S7 and a light exit (second) surface S8 with both of those surfaces having the radius of curvatures listed in Table 1 of FIG. 4. The fifth lens L5 has a light entrance (first) surface S9 and a light exit (second) surface S10 with both of those surfaces having the radius of curvatures listed in Table 1 of FIG. 4. The sixth lens L6 has a light entrance (first) surface S11 and a light exit (second) surface S12 with both of those surfaces having the radius of curvatures listed in Table 1 of FIG. 4. The seventh lens L7 has a light entrance (first) surface S13 and a light exit (second) surface S14 with both of those surfaces having the radius of curvatures listed in Table 1 of FIG. 4. The eighth lens L8 has a light entrance (first) surface S15 and a light exit (second) surface S16 with both of those surfaces having the radius of curvatures listed in Table 1 of FIG. 4. The ninth lens L9 has a light entrance (first) surface S17 and a light exit (second) surface S18 with both of those surfaces having the radius of curvatures listed in Table 1 of FIG. 4. The tenth lens L10 has a light entrance (first) surface S19 and a light exit (second) surface S20 with both of those surfaces having the radius of curvatures listed in Table 1 of FIG. 4. The eleventh lens L11 has a light entrance (first) surface S21 and a light exit (second) surface S22 with both of those surfaces having the radius of curvatures listed in Table 1 of FIG. 4. The twelfth lens L12 also has a light entrance (first) surface S23 and a light exit (second) surface S24 with both of those surfaces having the radius of curvatures listed in Table 1 of FIG. 4.

In addition, the Dewar window 18 has a light entrance (first) surface S25 and a light exit (second) surface S26 with both of those surfaces having the radius of curvatures listed in Table 1 of FIG. 4. Likewise, the filter 20 has a light entrance (first) surface S27 and a light exit (second) surface S28 with both of those surfaces having the radius of curvatures listed in Table 1 of FIG. 4. Finally, the focal plane 16 has a first surface S29 with that surface having the radius of curvature listed in Table 1 of FIG. 4.

Each one of the lenses L1, L2, L3, L4, L5, L6, L7, L8, L9, L10, L11 and L12 is individually supported by a conventional lens holder or cell (only diagrammatically shown) 25 and each conventional lens holder or cell 25 is, in turn, supported by the housing 24. Each lens holder or cell 25 fixedly supports the associated lens so that the associated lens is centered with respect to the optical axis A. That is, each lens holder or cell 25 has an inner diameter which is sized to support the exterior circumference of the associated lens. Additionally, each one of the lens holder or cell 25 has an identical outer diameter which is sized to be slidable within a cylindrical tube that forms the housing 24 of the optical lens system 14. Each one of the conventional lens holder or cell 25 may also have conventional tilt/angular adjustment features which ensure that each lens lies in a plane which extends normal to the optical axis A of the optical lens system 14. The housing 24 is typically manufactured from a light weight, strong and durable material, such as aluminum or Inconel (or any suitable austenite nickel-chromium-based superalloy) which can be securely fastened to the Dewar 40 in a conventional manner by conventional fasteners.

In addition, a (cylindrical) spacer 26 is utilized to assist with precisely spacing each adjacent pair of lenses L1, L2, L3, L4, L5, L6, L7, L8, L9, L10, L11 and L12 and conventional lens holders from one another. Each one of the spacers 26 is manufactured from a suitable material, e.g., aluminum, stainless steel 316, Kovar (or any suitable nickel-cobalt ferrous alloy), titanium or Inconel 625 (or any similar austenite nickel-chromium-based alloy). The housing 24 has a stop 68 located at the end thereof having a flange 66 which is securely fastened to a flange 60 of the Dewar 40 by conventional fasteners (not shown). Each one of the lenses L1, L2, L3, L4, L5, L6, L7, L8, L9, L10, L11 and L12, along with its respective spacer 26, is loaded within the opposite end of the housing 24 remote from the stop 68 in the reverse sequential order, i.e., a space 26 is loaded first followed by the twelfth lense L12, then another spacer 26, followed by the eleventh lense L11, then another spacer 26, followed by the next lens until all twelve lenses are installed within the housing 24. Next, a spring S may then loaded within the housing and retained by a conventional (threaded) fastener so that the spring S loads or compresses each one of the lenses L1, L2, L3, L4, L5, L6, L7, L8, L9, L10, L11 and L12 and the spacers 26 against the stop 68 while the spring S also permits limited expansion/contraction of the lens holders or cells 25 holding lenses L1, L2, L3, L4, L5, L6, L7, L8, L9, L10, L11 and L12 with respect to housing 24 and each other.

As a result of such arrangement, when the housing 24 is exposed to an operating temperature above room temperature, e.g., the optical lens system 14 is operating under hot operating conditions, the housing 24, the spacers 26, the lenses L1, L2, L3, L4, L5, L6, L7, L8, L9, L10, L11 and L12 and the lens holders or cells 25 can all gradually expand as the optical lens system 14 is gradually heated while operating under such hot operation conditions and the lens holders or cells 25 (and supported lenses) and the spacers 26 can minutely slide relative to the housing 24. Alternatively, as the housing 24 is subjected to temperatures below room temperature, e.g., the optical lens system 14 is operating under cold operating conditions, the housing 24, the spacers 26, the lenses and the lens holders or cells 25 can all gradually contract as the optical lens system 14 is gradually cooled while operating under such cold operation conditions and the lens holders or cells 25 (and supported lenses) and the spacers 26 can minutely slide relative to the housing 24. The optical lens system 14 is designed so that as the housing 24, the spacers 26, the lenses and the lens holders or cells 25 all correspondingly gradually contract or expand, the optical lens system 14 will still accurately and consistently focus both the mid-wave infrared and the long-wave infrared wavelength light 22 on the imaging or focal plane 16.

FIG. 2A is a diagrammatic representative showing the various paths that discrete rays of light 22 may follow through the array of the transparent materials or lens L1, L2, L3, L4, L5, L6, L7, L8, L9, L10, L11 and L12 of the optical lens system 14, when the present invention is in operation. As diagrammatically shown in this Figure, both the mid-wave infrared and the long-wave infrared wavelength light 22 are consistently and reliably focused at the focal plane 16 of the optical lens system 14. The optical lens system 14 is designed to consistently and reliably focus both the mid-wave infrared and the long-wave infrared wavelength light on the focal plane 16 over a wide range of operating temperatures.

Figure 2B:
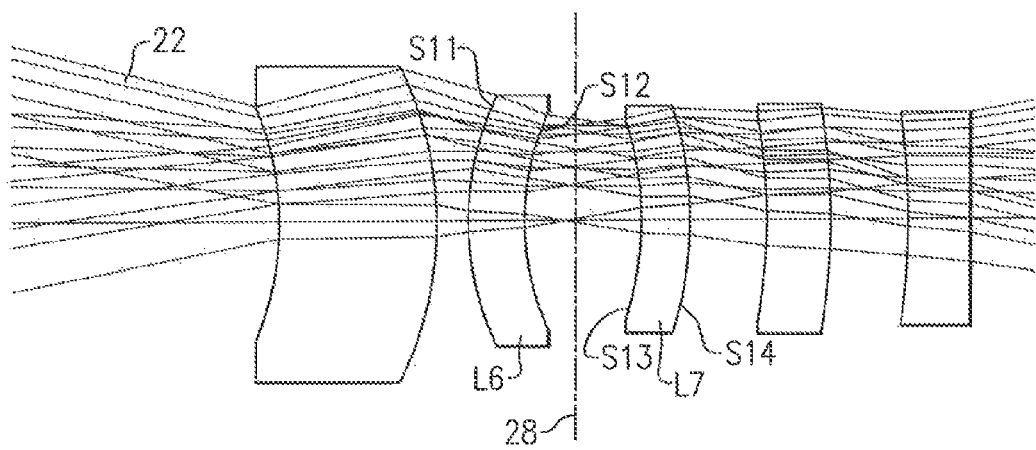
FIG. 2B is an enlarged view of a section of the optical lens system of FIG. 2A showing the focusing of the mid-wave infrared and the long-wave infrared light at a preliminary imaging plane.

As generally shown in FIG. 2B, the optical lens system 14 is designed to focus preliminarily both the mid-wave infrared and the long-wave infrared light 22 at a preliminary imaging plane 28 located within the optical lens system 14 at a first location before the focal plane 16. As generally shown in this Figure, both the mid-wave infrared wavelength light and the long-wave infrared wavelength light 22 are focused at the preliminary imaging plane 28 which is located between the sixth lens L6 and the seventh lens L7. This preliminary imaging plane 28 is located just prior to the mid-wave and the long-wave infrared light 22 entering the first surface S13 of the seventh lens L7. As a result of this preliminary imaging plane 28, both the mid-wave and the long-wave infrared light 22, as such light passes through the seventh lens L7, commences re-expansion and then is again eventually refocused, by the remaining lenses, e.g., lenses L8 through L12, on the imaging or focal plane 16. It is to be appreciated that the location of the preliminary imaging plane 28 can vary from application to application without departing for the spirit and scope of the present invention.

FIGS. 3A and 3B show two different embodiments of the present invention. As shown in these Figures, the transparent materials or lens L1, L2, L3, L4, L5, L6, L7, L8, L9, L10, L11 and L12 are spaced at varying distances from one another in these different embodiments. As diagrammatically shown in these figures, the transparent materials or lens L1, L2, L3, L4, L5, L6, L7, L8, L9, L10, L11 and L12 may each have varying thicknesses and curvatures. According to both embodiments, the Dewar window 18 and the filter 20 are both located between the last exit transparent material or lens L12 and the focal plane 16 of the optical lens system 14. The infrared light 22, e.g, both mid-wave and long-wave infrared light, when traveling thorough the optical lens system 14, passes through each and every one of the transparent materials or lenses L1 L2, L3, L4, L5, L6, L7, L8, L9, L10, L11 and L12 of the system 14, the Dewar window 18 and the filter 20 before finally being imaged and focused on the focal plane 16.

It is to be appreciated that, according to the present invention, only a single optical lens system 14 is required in order to obtain imaging data in both wave-bands, i.e., in the mid-wave infrared regions as well as the long-wave infrared regions. This is particularly useful because this single optical lens system 14 avoids the need for having two separate imaging systems, e.g., a first imaging system for the mid-wave infrared region and a second imaging system for the long-wave infrared region, and facilitates using a single detector device 30, which is part of the Dewar 40, for detecting and processing the images in both the mid-wave infrared region and the long-wave infrared region. The filter 20 is designed to block unwanted light from passing therethrough and being focused on the focal plane 16. For example, the filter 20 may block out light which has a wavelength below 3 mm and above 10.5 mm.

By performing all these functions in a single optical lens system 14, the number of optical components as well as the a commensurate number of opto-mechanical mounting components is significantly reduced from traditional optical lens systems which operate non-simultaneously in either waveband. Additionally, the system typically does not require any external, mechanical intervention(s) or adjustment mechanism(s) in order to remain in focus, thereby eliminating the need for such mechanical components, such as motors, precision translation stages and associated power supplies, computer processors, focusing algorithms and the like, which are typically associated with focusing of traditional optical systems. This reduction in the overall number of components for the imaging system and also minimizes the associated cost because the design footprint, according to the present invention, is significantly reduced and minimized.

Figure 5:
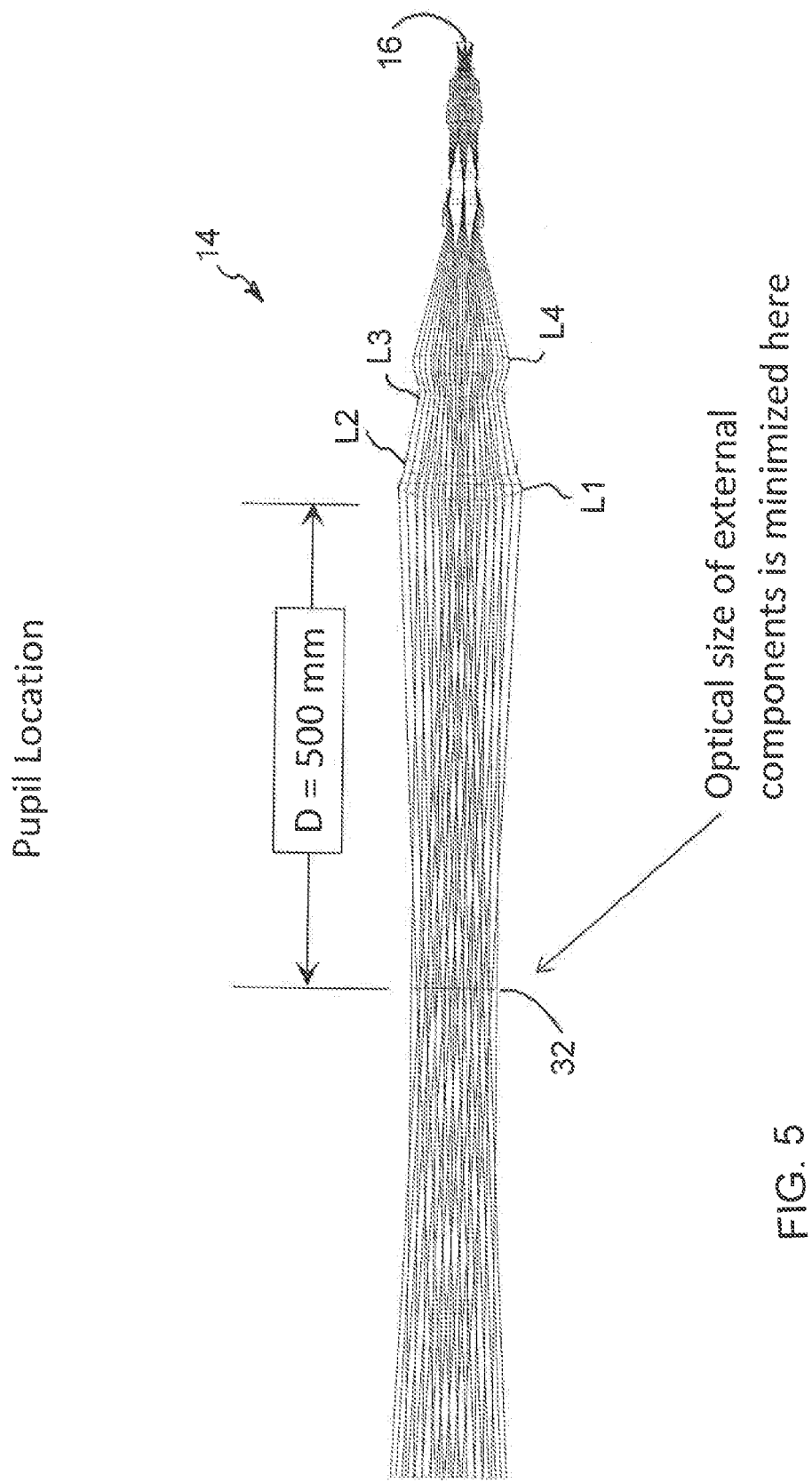
FIG. 5 is a diagrammatic representation of the optical lens system showing a representative entrance pupil location.

FIG. 5 shows the entrance pupil 32 located at a predetermined distance in front of the first surface of the first entrance lens L1 of the optical lens system 14. As shown in this Figure, the entrance pupil 32 is located 500 mm (19.68 inches) in front of the first entrance lens L1 of the optical lens system 14, in this example. It is to be appreciated, however, that the location of the entrance pupil 32 can vary, from application to application, without departing from the spirit and scope of the present invention. Preferably, the entrance pupil 32 will typically be located in front of the first entrance lens L1 of the optical lens system 14 by a distance of between 0.0 (0.0 inches) and 5,000 mm (196.81 inches), and more preferably the entrance pupil 32 will be located in front of the first entrance lens L1 by a distance of between 250 mm (9.84 inches) and 750 mm (29.52 inches).

It is to be appreciated, however, that the greater the distance that the entrance pupil 32 is located away from and in front of the first surface S1 of the first entrance lens L1 of the optical lens system 14, this tends to increase the size of each one of the associated lens, e.g., lenses L1, L2, L3, L4, L5, L6, L7, L8, L9, L10 L11 and L12, of the optical lens system 14. Therefore, while it is desirable for the entrance pupil 32 to be located in front of the first entrance lens L1, it is to be appreciated that there is an associated cost with locating the entrance pupil 32 too far in front of the first entrance lens L1 of the optical lens system 14.

If desired, one or more mirrors, the beam splitters, etc., may be located between the entrance pupil 32 and the first lens L1 of the optical lens system 14. As the present invention is contemplated for use within an aircraft, one or more mirrors (not shown) having conventional image stabilization technology, may be located between the entrance pupil 32 and the first entrance lens L1 of the optical lens system 14 in order to compensate for vibration of the aircraft. Thereby assisting with stabilizing the collected mid-wave infrared and long-wave infrared light 22, so that such light may be reliably, consistently and accurately focused by the optical lens system 14 on the imaging or focal plane 16.

Figure 6:
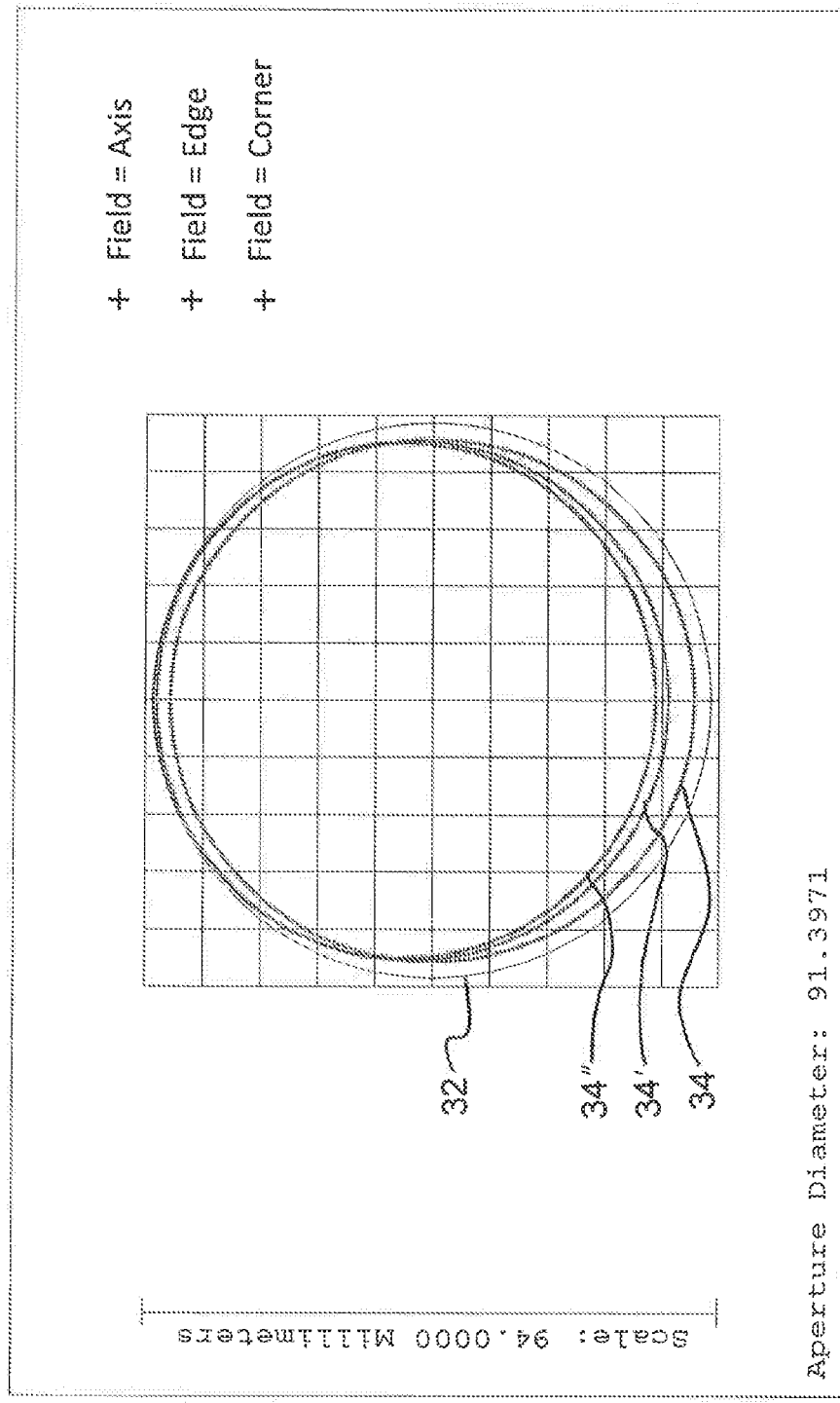
FIG. 6 is an aperture footprint at external entrance pupil.

FIG. 6 is a diagrammatic representation of an aperture footprint at the external entrance pupil 32 for the optical lens system 14. The clear aperture 34 along the optical axis of the focal plane 16, the clear aperture 34 along an edge of the focal plane 16, and the clear aperture 34" at or corner of the focal plane 16 are each shown in this Figure. It is readily apparent that each one of the clear apertures 34, 34' and 34" are generally coincident with one another and located within the external entrance pupil 32 for the optical lens system 14.

Figure 7:
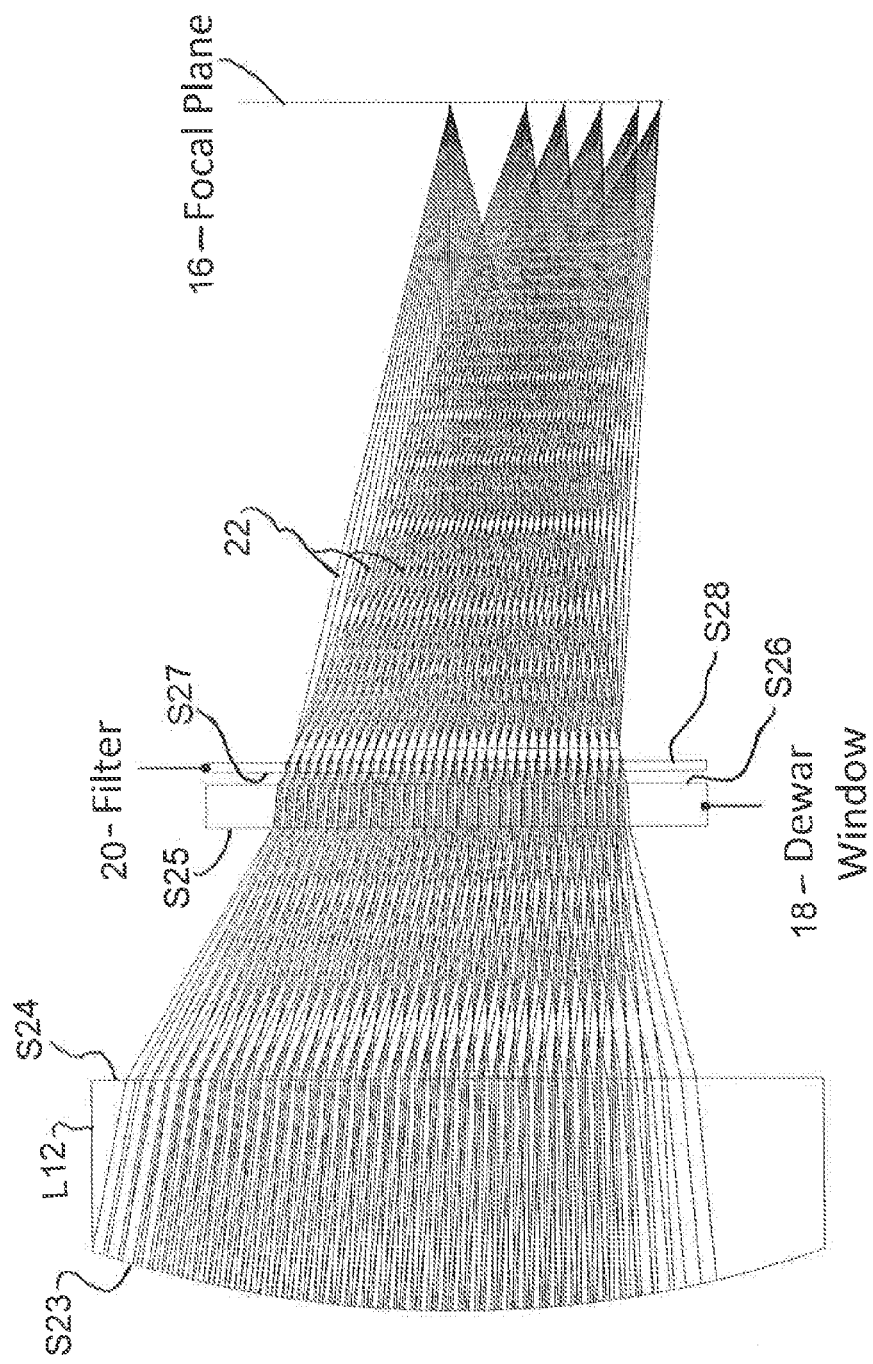
FIG. 7 is an enlarged diagrammatic illustration of the Dewar window and filter showing focusing of the light on the focal plane.

FIG. 7 is an enlarged diagrammatic illustration of the embodiment of FIG. 1, showing the Dewar window 18 and the filter 20 which assist with focusing both the mid-wave infrared and the long-wave infrared light 22 on the focal plane 16 (for simplicity a remainder of the Dewar 40 is not shown).

Figure 8A:
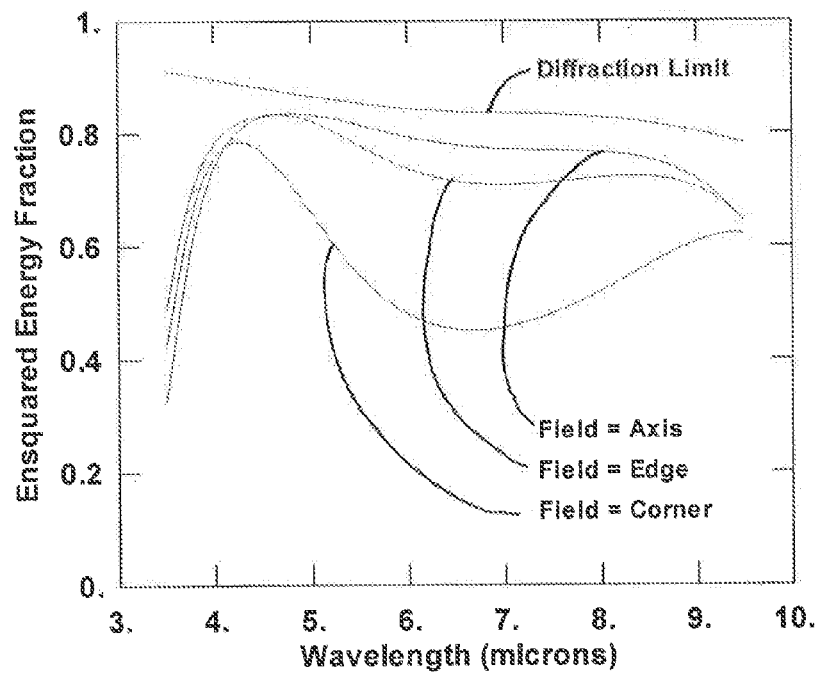
FIGS. 8A and 8B are graphical representations showing beam diffraction for the focused light at the focal plane at the imaging axis, at an edge and at a corner.
Figure 8B:
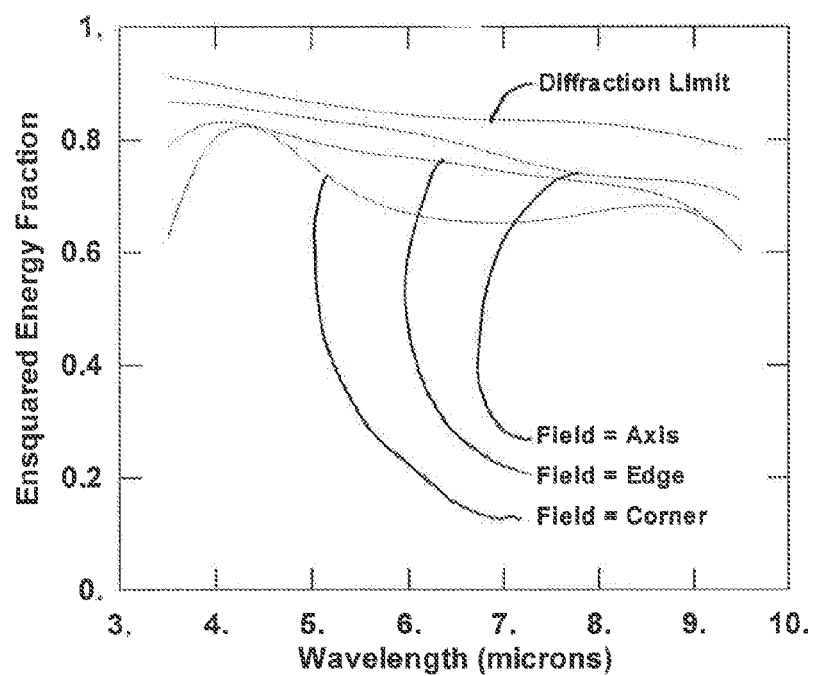

FIGS. 8A and 8B are graphical representations showing beam diffraction for the focused light at the optical axis A of the focal plane 16, for the focused light at an edge of the focal plane 16 and for the focused light at a corner of the focal plane 16. As apparent from both of these Figures, according to the present invention, all of the focused light 22 is below the diffraction limit of the optical lens system 14.

Figure 9:
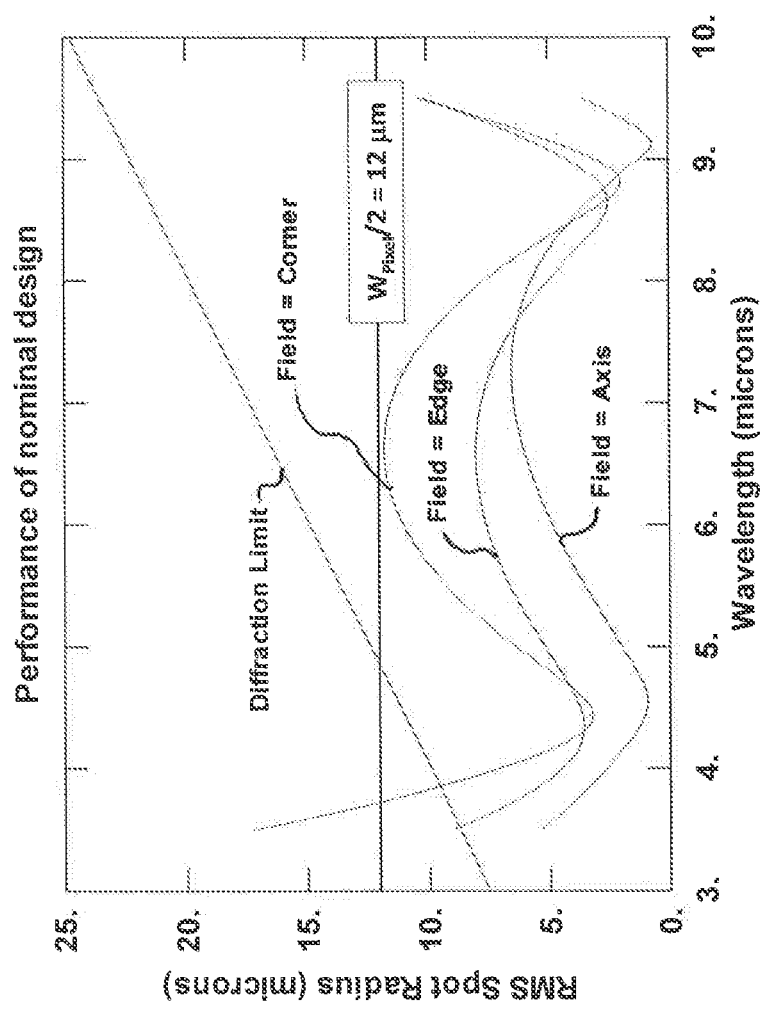
FIG. 9 is a graphical representation of the RMS spot radius as a function of wavelength showing the performance of the first embodiment of the present invention.

FIG. 9 is a graphical representation of the RMS spot radius as a function of wavelength showing the performance of the optical lens system 14 according to the embodiment of FIG. 1. As is apparent from this Figure, both mid-wave infrared light (e.g., light having a wavelength from about 3½ mm to about 6.5 mm) and the long-wave infrared wavelength light 22 (e.g., light having a wavelength from about 8 mm to about 11 mm) is focused at the optical axis A of the focal plane 16, focused at an edge of the focal plane 16 and focused at a corner of the focal plane 16, and all of this focused light is below the diffraction limit of the optical lens system 14.

Figure 10A:
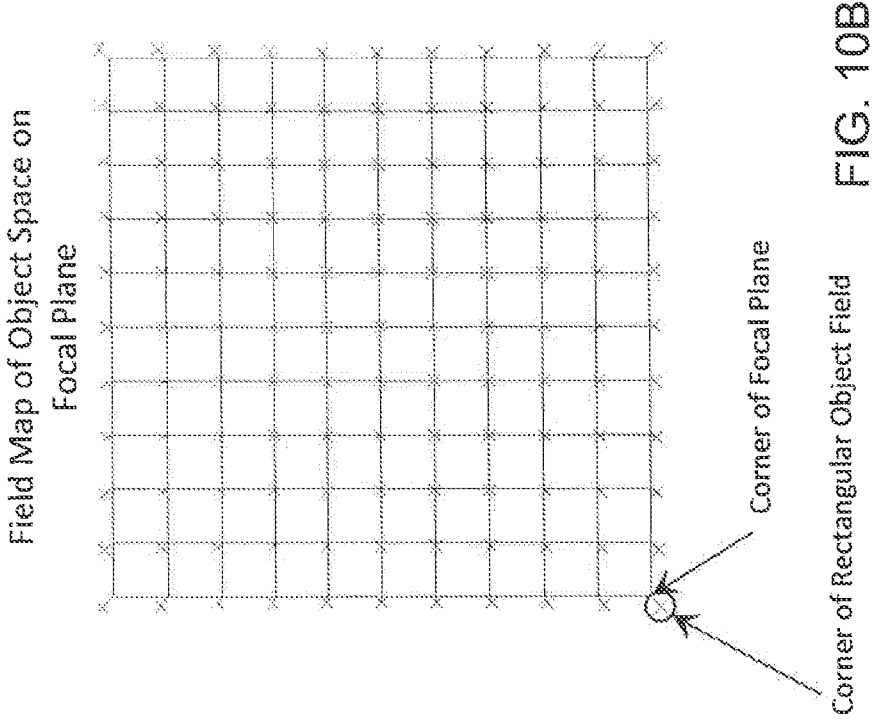
FIGS. 10A and 10B are respectively a graphical representation of image distortion and a mapping of object space field of view onto the focal plane.
Figure 10B:
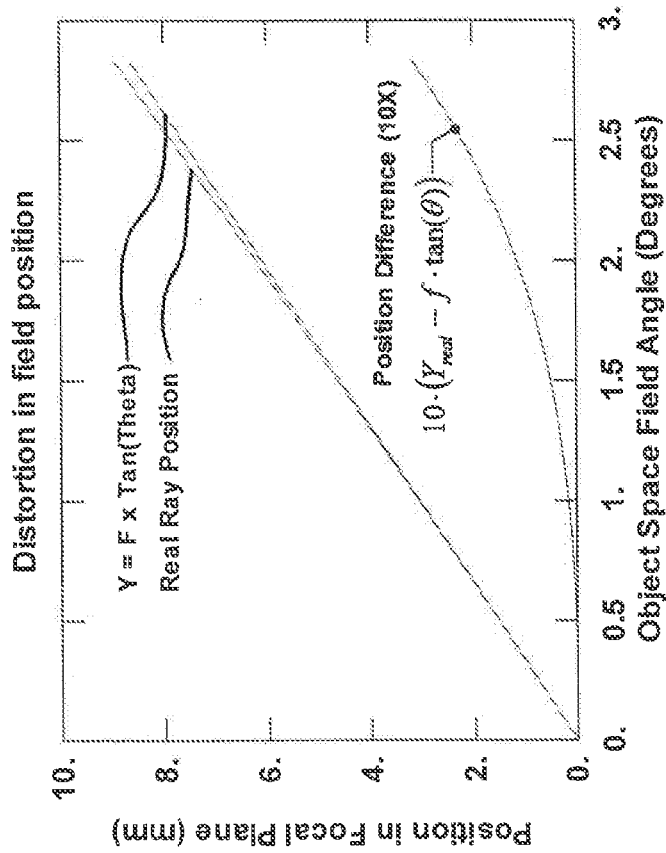

FIG. 10A is a graphical representation of image distortion while FIG. 10B is a mapping of object space field of view onto the focal plane 16. In view of these two representations, it is apparent that a rectangular object field will be generally pincushion-shaped on the focal plane 16 while a rectangular focal plane 16 will be generally barrel-shaped when mapped into the object space.

Figure 13A:
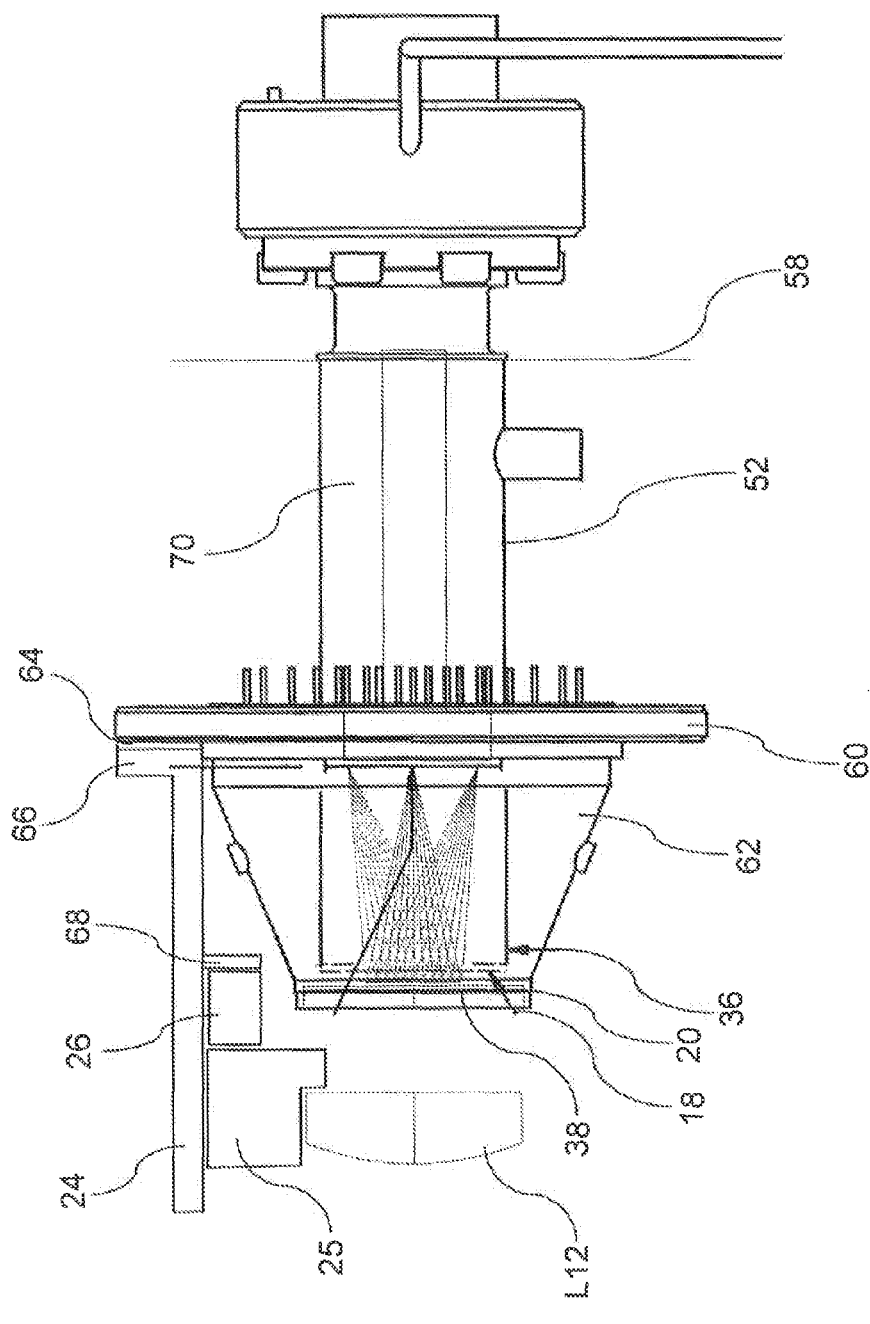
FIGS. 13A and 13B are, respectively, a diagrammatic representation of a thermal model of Dewar correspondence of dummy surfaces to mechanical model and graphic representation model of thermal flow of the same illustrated via a thermo-mechanical interface model.
Figure 13B:
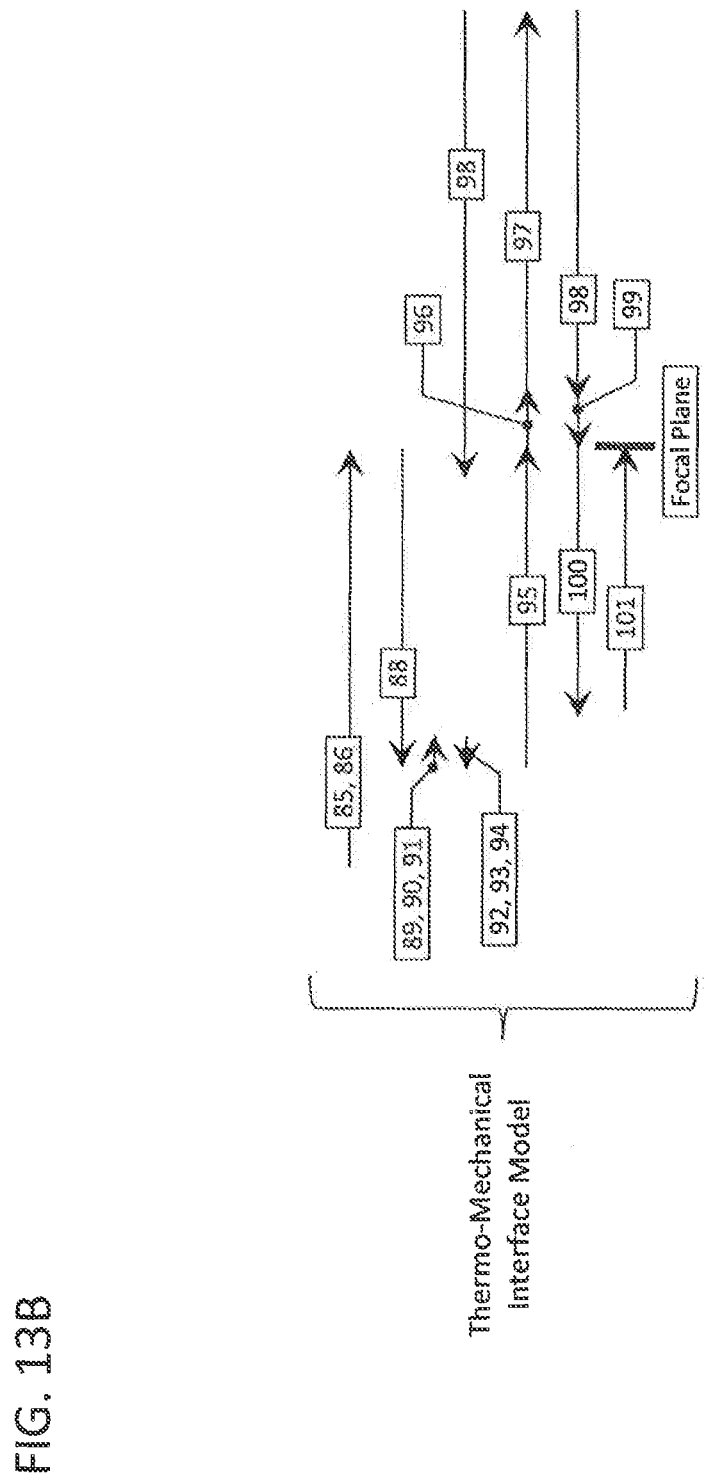

FIG. 13A is a diagrammatic side elevational view of thermal model of the Dewar 40 which includes the Dewar window 18, the filter 20 and the detector device 30 for detecting the focused images of both the mid-wave and the long-wave infrared light 22 on the focal plane 16 while FIG. 11 is a table of the thermal model of the various surfaces of the components in FIG. 13A. FIG. 13B is an illustration showing a thermo-mechanical interface model of the components in FIG. 13A. FIGS. 12A and 12B are, respectively, a graphic and a table representation of various embodiments having differing passive athermal chassis/housing designs. The optimization assumes that the entire chassis/housing 24/spacers 26 are manufactured from a single material. It is to be appreciated that the optimal value of the CTE will be different if parts of the housing 24 are manufactured or made from two or more different materials.

As generally shown in FIG. 13A, the present invention includes a shield 36 which completely surrounds the focal plane 16 and is designed to thermally block any background light, i.e., light which does not pass through the optical lens system 14, from interfering with detection of the focused mid-wave and long-wave infrared light 22 by the detector device 30. As diagrammatically shown in this Figure, the shield 36 completely surrounds the entire perimeter of the focal plane 16 and also extends axially along the optical axis A from the focal plane 16 toward the filter 20 but the shield 36 terminates just short of the filter 20. The shield 36 inside the Kovar Dewar envelope 62 has a light entrance opening 38 located adjacent the filter 20. As a result of such arrangement, the shield 36 forms a shroud which completely surrounds the focal plane 16. The shield 36 is generally designed to prevent any unwanted and undesired background light, i.e., light which does not pass through the optical lens system 14, from otherwise interfering with detection, by the detector device 30, of the mid-wave and long-wave infrared light 22 which passes through the optical lens system 14 and is focused on the focal plane 16.

The shield 36 is accommodated within a Dewar housing and the Dewar window 18 closes and seals the inlet opening of the Dewar 40. As a result of this arrangement, the shield 36 is vacuum sealed within a housing of the Dewar 40. Preferably the cold shield 36 is cooled, e.g., by liquid nitrogen, to a temperature of about 77° K so that any extraneous light, i.e., light which does not pass through the optical lens system 14, passes through the shield 36, such extraneous light will be sufficiently cooled to a low enough temperature so that such extraneous light does not affect detection of the desired mid-wave infrared and long-wave infrared wavelength light 22, passing through the optical lens system 14, by the detector device 30. In addition, the entire detector device 30 as well as a remainder of the housing of the Dewar 40, e.g., from the Dewar flange 60 to the end 58 of the cold finger (isothermal) 52, are all sufficiently cooled, e.g., by liquid nitrogen, with a Kovar housing 70 so that the detector device 30 does not appreciably detect, during operation, any light emanating from the Dewar 40. Also illustrated herein is the plane 64 of the Selex Dewar interface 50 between the housing flange 66 and the dewar flange 60

Figure 14:
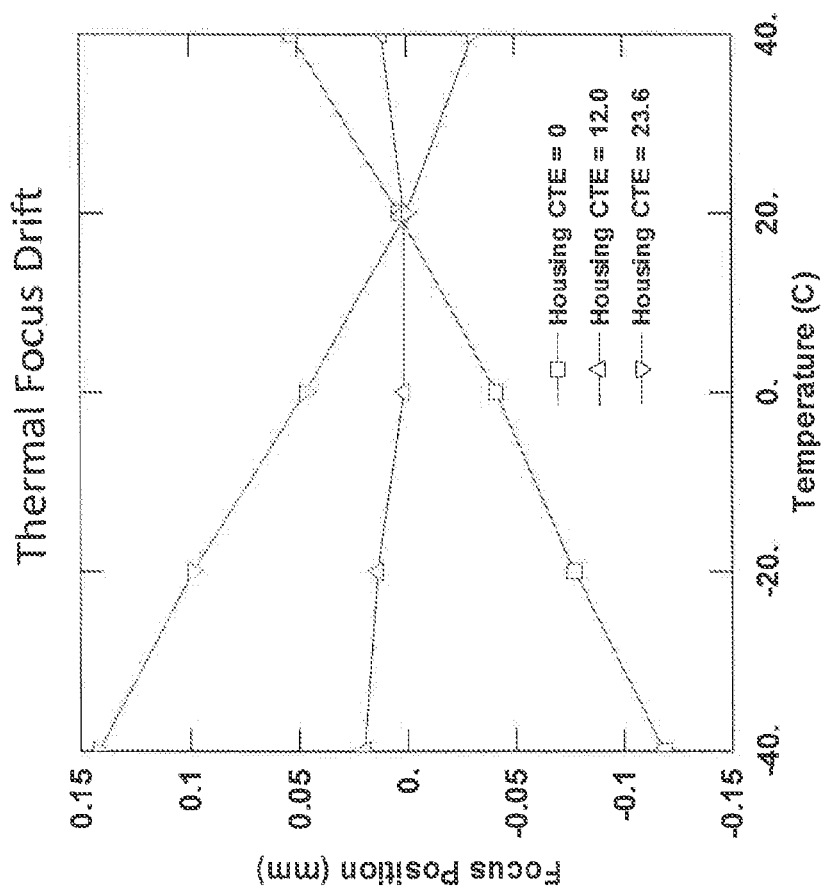
FIG. 14 is a graphical representation of the thermal focus drift of various housing.

FIG. 14 is a graphical representation of the thermal focus drift for three different housings 24, respectively, which each respectively have a CTE value of 0.0, 12.0 and 23.6. It is to be appreciated that the CTE value of 12.0 provides the best results over a wide range of operating temperatures.

Figures 15A, 15B:
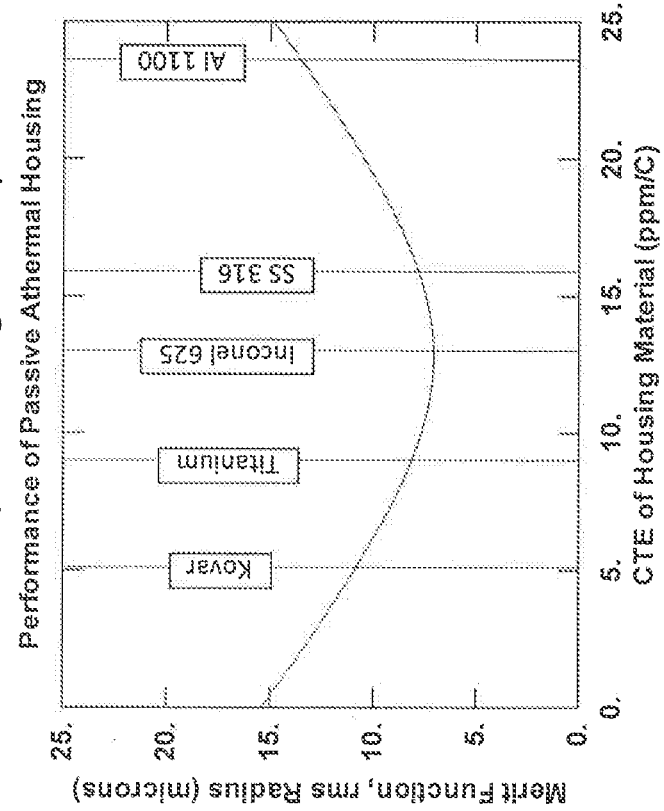
FIGS. 15A and 15B are, respectively, a graphic representation and a table representation of different materials for use as the passive athermal housing.

FIG. 15A and FIG. 15B are, respectively, a graphic representation and a table representation of the Merit Function (MF) of various embodiments of the passive athermal housing 24 when utilizing various housing materials having different CTE values. The Merit Function (MF) represents the rms blur radius averaged over field and temperature and is represented by the formula below:

$$MF^2 = \frac{\sum_{T_i} \sum_{\theta_i} \sigma^2 rms}{N_t M_\theta}$$

Figures 16A, 16B:
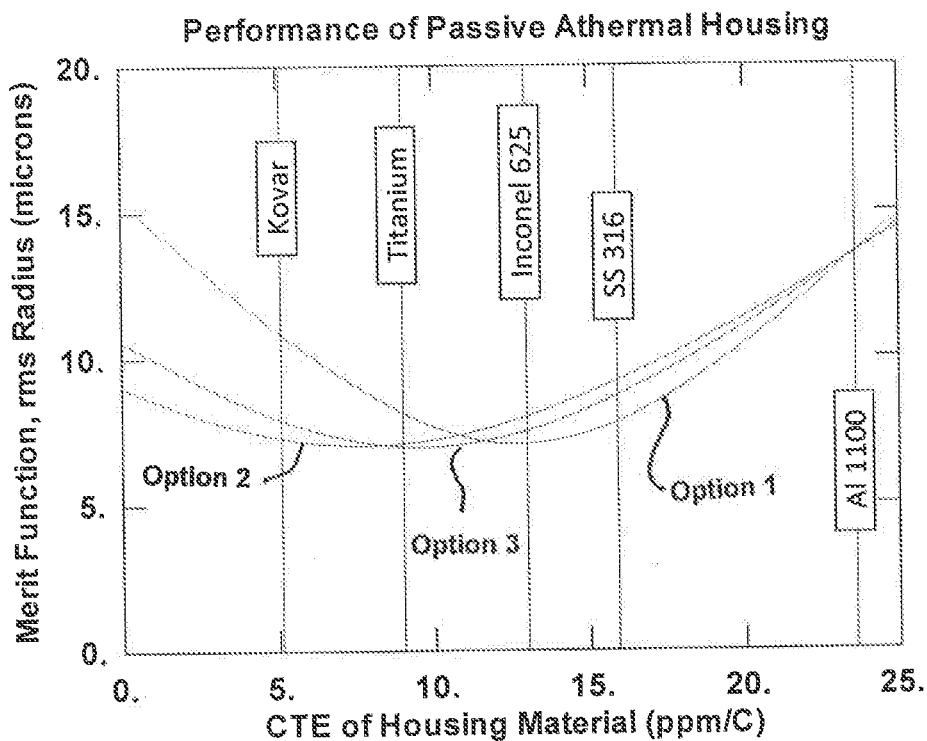
FIGS. 16A and 16B are, respectively, a graphic representation and a table representation showing the performance of alternative embodiments of three configurations of the spacer material and passive athermal housing.
Figure 16C:
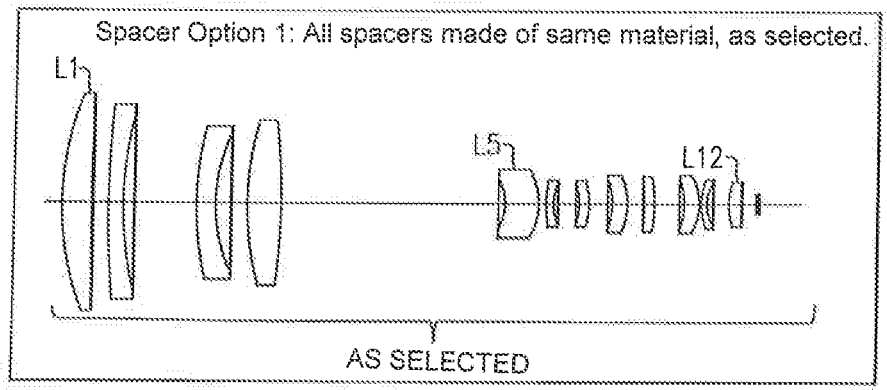
FIG. 16C, FIG. 16D, and FIG. 16E are diagrammatic representations of the three configurations of alternative spacer and housing embodiments from FIGS. 16A-16B.
Figure 16D:
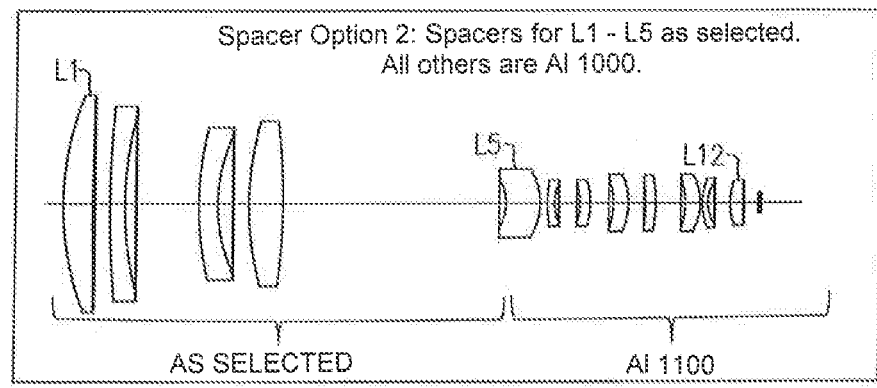
Figure 16E:
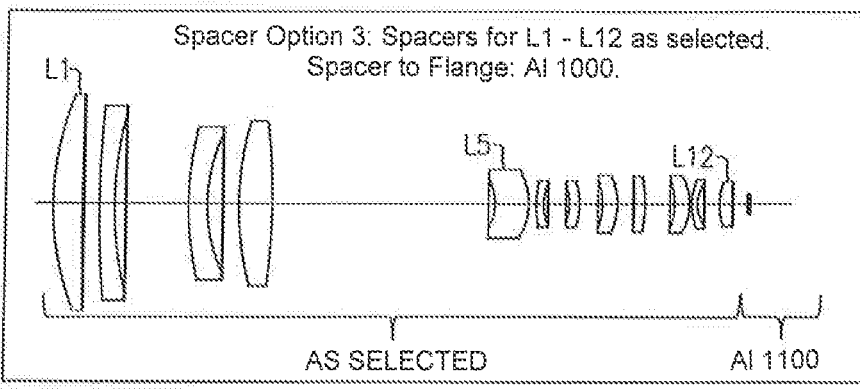

As shown in FIGS. 16A-16E, it is to be appreciated that the arrangement of the spacers 26 can have a variety of different configurations. For example, as diagrammatically shown in FIG. 16C, all the spacers 26 can be manufactured from the same material, namely, Inconel 625 in this instance. Alternatively, as shown in FIG. 16D, the four (4) spacers 26 for the first four (4) lenses, namely, lenses L1, L2, L3 and L4, are manufactured from a first spacer material, namely, Inconel 625, while the remaining spacers 26 for the remaining seven (7) lenses, namely, lenses L5, L6, L7, L8, L9, L10, L11, L12 and the focal plane 16 are manufactured from a second material, namely, Al 1100. According to yet another alternative, as shown in the embodiment depicted in FIG. 16E, the spacers 26 for the 12 lenses, namely, lenses L1, L2, L3, L4, L5, L6, L7, L8, L9, L10, L11 and L12, are each manufactured from a first spacer material, namely, Kovar, while the spacer 26 between the twelfth lens L12 and the stop 68 of the housing 24 is manufactured from a second material, namely, Al 1100.

FIGS. 17A and 17B are, respectively, a graphic representation and a table representation of various aluminum alloy spacer materials, while FIG. 17C is an embodiment of the housing 24 in which the spacers between the twelve (12) lenses are manufactured from a first material, such as Inconel 625, titanium or Kovar, while the spacer 26 between the twelfth lens L12 and the stop 68 of the housing 24 is manufactured from a variety of aluminum alloys, namely, Al 6061, Al 6063, Al 16063, Al 1110 or Al 5053, having various CTE values.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

I claim:

1. An optical system comprising:
   at least one beam of infrared light including both mid-wave infrared light and long-wave infrared light;
   an external entrance pupil, for infrared light to be shown through, being located in front of the optical system;
   a transparent formed material through which the at least one beam of infrared light, including both mid-wave infrared light and long-wave infrared light, travels;
   a series of optical materials spaced at varying distances from one another by a series of spacers, a respective spacer, of the series of spacers, separating each adjacent pair of optical materials from one another during operation of the optical system;
   a Dewar window, and a filter being located between the last optical material and a focal plane;
   the series of optical materials and spacers being selected and arranged so as to simultaneously focus both the mid-wave infrared light and the long-wave infrared light of the at least one beam of infrared light on the focal plane; and
   the series of spacers varying the spacing of the optical materials from one another, during operation of the optical system, so that the optical system is passively athermal over an operating temperature range from about −40° C. to about 60° C.

2. The optical system according to claim 1, wherein the at least one beam of infrared light passes through the series of optical materials, the optical materials are shaped in varying thicknesses and varying curvature, the infrared light refracting through the transparent formed material, optical materials, and the filter resulting in varying wavelengths of light appearing on the focal plane.

3. The optical system according to claim 1, wherein the at least three lenses of the series of optical materials comprises:
   a first lens having a first surface with a first radius of curvature of 196.382 mm (7.732 inches) and a second surface with a second radius of curvature of 1347.588 mm (53.055 inches);
   a second lens having a first surface with a first radius of curvature of 957.403 mm (37.693 inches) and a second surface with a second radius of curvature of 258.848 mm (10.191 inches); and
   a third lens having a first surface with a first radius of curvature of 205.265 mm (8.081 inches) and a second surface with a second radius of curvature of 110.055 mm (44333 inches).

4. The optical system according to claim 1, wherein the series of optical materials are selected and arranged so as to simultaneously focus both the mid-wave infrared light, having a wavelength from about 3.5 mm to about 6.5 mm, and the long-wave infrared light, having a wavelength from about 8 mm to about 11 mm.

5. An optical lens system for receiving light, via an entrance pupil, and focusing light on a focal plane for detection by a detector device, the optical lens system comprising:
   a series of optical materials comprising a first optical material and a last optical material with a plurality of other optical materials located between the first optical material and the last optical material;
   a housing accommodating the series of optical materials, and each of the optical materials being spaced a desired distance from one another;
   the external entrance pupil for supplying infrared light to the series of optical materials of the optical lens system, and the entrance pupil being located in front of the series of optical materials;
   at least one beam of infrared light passing through the external entrance pupil and through the series of optical materials accommodated within the housing;
   a Dewar window and a filter being located between the last optical material and the focal plane;
   each of the optical materials, of the series of optical materials of the optical lens system, being spaced from an adjacent optical material by a spacer which is selected and arranged to correspondingly expand or contract, due to temperature changes of the optical lens system, and thereby minutely ater the relative spacing of each the series of optical materials from one another and simultaneously focus both mid-wave infrared light and long-wave infrared light, of the at least one beam of infrared light, on the focal plane over an operating temperature range from about −40° C. to about 60° C.

6. The optical lens system according to claim 5, wherein the series of optical materials comprise a plurality of optical materials manufactured from different materials, and each optical material comprises a lens which varies in both thicknesses and curvature, so that the at least one beam of infrared light, when refracted through the series of optical materials, the Dewar window and the filter, results in varying wavelengths of light being focused on the focal plane.

7. The optical lens system according to claim 5, wherein the series of optical materials comprise twelve different optical lens, and each optical lens varies in both thicknesses and curvature so that the at least one beam of infrared light, when refracting through the twelve different optical lens, the Dewar window and the filter, results in varying wavelengths of light being focused on the focal plane.

8. The optical lens system according to claim 5, wherein the external entrance pupil, for supplying infrared light to the series of optical materials of the optical lens system, is located between 250 mm (9.8425 inches) and 750 mm (29.5276 inches) in front of the first optical material.

9. The optical lens system according to claim 8, wherein the external entrance pupil, for supplying infrared light to the series of optical materials of the optical lens system, is located 443.050 mm (17.44 inches) in front of the first optical material.

10. The optical lens system according to claim 5, wherein the at least one beam of infrared light has a wavelength of between about 3 microns and about 11 microns.

11. The optical lens system according to claim 5, wherein the housing, which accommodates the series of optical materials, is manufactured from one of aluminum, stainless steel, austenite nickel-chromium-based superalloy, titanium, nickel-cobalt ferrous alloy, and nickel-iron alloy.

12. The optical lens system according to claim 5, wherein the focal plane is formed on a detector device, and a rear surface of the focal plane of the detector device is cooled with liquid nitrogen for providing cold shield efficiency and suppression of any background images.

13. The optical lens system according to claim 5, wherein a shield is located between the filter and the focal plane for cooling the focal plane of the detector device, and the focal plane of the detector device is cooled with liquid nitrogen.

14. The optical lens system according to claim 5, wherein the Dewar window is located adjacent the last optical material and the filter is located adjacent the focal plane.

15. The optical lens system according to claim 5, wherein each spacer is capable of shifting the adjacent pair of optical materials, when the temperature of the optical lens system is altered during operation, so that the optical system remains focused from about −40° C. to about 60° C.

16. The optical lens system according to claim 5, wherein the series of optical materials comprises
  a first lens having a first surface with a first radius of curvature of 196.382 mm (7.732 inches) and a second surface with a second radius of curvature of 1347.588 mm (53.055 inches);
  a second lens having a first surface with a first radius of curvature of 957.403 mm (37.693 inches) and a second surface with a second radius of curvature of 258.848 mm (10.191 inches);
  a third lens having a first surface with a first radius of curvature of 205.265 mm (8.081 inches) and a second surface with a second radius of curvature of 110.055 mm (4.333 inches);
  a fourth lens having a first surface with a first radius of curvature of 195.500 mm (7.697 inches) and a second surface with a second radius of curvature of −385.433 mm (−15.175 inches);
  a fifth lens having a first surface with a first radius of curvature of −39.727 mm (−1.564 inches) and a second surface with a second radius of curvature of −44.771 mm (−1.763 inches);
  a sixth lens having a first surface with a first radius of curvature of 55.505 mm (2.185 inches) and a second surface with a second radius of curvature of 32.464 mm (1.278 inches);
  a seventh lens having a first surface with a first radius of curvature of −43.915 mm (−1.729 inches) and a second surface with a second radius of curvature of −55.332 mm (−2.178 inches);
  an eighth lens having a first surface with a first radius of curvature of −50.805 mm (−2.000 inches) and a second surface with a second radius of curvature of −39.984 mm (−1.574 inches);
  a ninth lens having a first surface with a first radius of curvature of −176.618 mm (−6.953 inches) and a second surface with a second radius of curvature of −144.498 mm (−5.689 inches);
  a tenth lens having a first surface with a first radius of curvature of −49.692 mm (−1.956 inches) and a second surface with a second radius of curvature of −40.824 mm (−1.607 inches);
  an eleventh lens having a first surface with a first radius of curvature of 40.167 mm (1.581 inches) and a second surface with a second radius of curvature of 25.800 mm (1.016 inches); and
  a twelfth lens having a first surface with a first radius of curvature of 44.720 mm (1.761 inches) and a second surface with a second radius of curvature of −13,341.439 mm (−525.253 inches).

17. The optical lens system according to claim 5, wherein the series of optical materials comprises
  a first lens having a first surface with a first clear aperture diameter of 141.38 mm (5.57 inches) and a second surface with a second clear aperture diameter of 138.21 mm (5.44 inches);
  a second lens having a first surface with a first clear aperture diameter of 126.92 mm (5.0 inches) and a second surface with a second clear aperture diameter of 120.11 mm (4.73 inches);
  a third lens having a first surface with a first clear aperture diameter of 100.02 mm (3.94 inches) and a second surface with a second clear aperture diameter of 92.08 mm (3.63 inches);
  a fourth lens having a first surface with a first clear aperture diameter of 108.08 mm (4.26 inches) and a second surface with a second clear aperture diameter of 107.74 mm (4.24 inches);
  a fifth lens having a first surface with a first clear aperture diameter of 31.86 mm (1.25 inches) and a second surface with a second clear aperture diameter of 44.82 mm (1.76 inches);
  a sixth lens having a first surface with a first clear aperture diameter of 32.84 mm (1.29 inches) and a second surface with a second clear aperture diameter of 28.83 mm (1.13 inches);
  a seventh lens having a first surface with a first clear aperture diameter of 27.72 mm (1.09 inches) and a second surface with a second clear aperture diameter of 30.43 mm (1.20 inches);

an eighth lens having a first surface with a first clear aperture diameter of 34.31 mm (1.35 inches) and a second surface with a second clear aperture diameter of 38.57 mm (1.52 inches);

a ninth lens having a first surface with a first clear aperture diameter of 34.63 mm (1.36 inches) and a second surface with a second clear aperture diameter of 34.66 mm (1.36 inches);

a tenth lens having a first surface with a first clear aperture diameter of 34.65 mm (1.36 inches) and a second surface with a second clear aperture diameter of 38.14 mm (1.50 inches);

an eleventh lens having a first surface with a first clear aperture diameter of 33.14 mm (1.30 inches) and a second surface with a second clear aperture diameter of 29.57 mm (1.16 inches); and a twelfth lens having a first surface with a first clear aperture diameter of 29.30 mm (1.15 inches) and a second surface with a second clear aperture diameter of 26.19 mm (1.05 inches).

18. An optical lens system for receiving light, via an entrance pupil, and focusing light on a focal plane for detection by a detector device, the optical lens system comprising:

a series of optical materials comprising a first optical material and a last optical material with a plurality of other optical materials located between the first optical material and the last optical material;

a housing accommodating the series of optical materials and each of the optical materials being spaced a desired distance from one another;

the external entrance pupil for supplying infrared light to the series of optical materials of the optical lens system, and the entrance pupil being located in front of the series of optical materials;

at least one beam of infrared light passing through the external entrance pupil and through the series of optical materials accommodated within the housing;

a Dewar window and a filter being located between the last optical material and the focal plane; and the series of optical materials are selected and arranged so as to simultaneously focus both mid-wave infrared light and long-wave infrared light of the at least one beam of infrared light on the focal plane;

wherein the series of optical materials of the optical lens system comprises:

a first series of optical lens which focuses an image of the at least one beam of infrared light at a preliminary imaging plane located between the first and the last optical materials, and a second series of optical lens which reexpand the at least one beam of infrared light, focused at the preliminary imaging plane, and refocuses the at least one beam of infrared light at the focal plane.

19. The optical lens system according to claim 18, wherein the series of optical materials sequentially comprises a first lens, a second lens, a third lens, a fourth lens, a fifth lens, a sixth lens, a seventh lens, an eighth lens, a ninth lens, a tenth lens, an eleventh lens and a twelfth lens, and the preliminary imaging plane is located between the fourth lens and the fifth lens.

20. The optical lens system according to claim 19, wherein the Dewar window is located adjacent the twelfth lens and the filter is located adjacent the focal plane.

* * * * *